US012175145B2

(12) United States Patent
Kaigawa

(10) Patent No.: US 12,175,145 B2
(45) Date of Patent: Dec. 24, 2024

(54) IMAGE-FORMING DEVICE AND SYSTEM INCLUDING IMAGE-FORMING DEVICE GROUP INCLUDING FIRST AND SECOND IMAGE-FORMING DEVICES, SERVER, AND MANAGEMENT TERMINAL

(71) Applicant: BROTHER KOGYO KABUSHIKI KAISHA, Nagoya (JP)

(72) Inventor: Shinsuke Kaigawa, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/497,090

(22) Filed: Oct. 30, 2023

(65) Prior Publication Data

US 2024/0143253 A1 May 2, 2024

(30) Foreign Application Priority Data

Oct. 31, 2022 (JP) ................................ 2022-174634

(51) Int. Cl.
*G06F 3/12* (2006.01)

(52) U.S. Cl.
CPC .......... *G06F 3/1257* (2013.01); *G06F 3/1204* (2013.01); *G06F 3/121* (2013.01); *G06F 3/1234* (2013.01); *G06F 3/1239* (2013.01); *G06F 3/1288* (2013.01)

(58) Field of Classification Search
CPC ...... G06F 3/1257; G06F 3/1204; G06F 3/121; G06F 3/1234; G06F 3/1239; G06F 3/1288
See application file for complete search history.

(56) References Cited

U.S. PATENT DOCUMENTS

2002/0161740 A1* 10/2002 Nakamura ............ G06F 3/1204
2005/0192928 A1* 9/2005 Kofuji ................. G06F 9/44505
2016/0107449 A1* 4/2016 Marra .................. B41J 2/17546
347/86
2018/0131831 A1 5/2018 Toilia et al.

* cited by examiner

*Primary Examiner* — John R Wallace
(74) *Attorney, Agent, or Firm* — Merchant & Gould P.C.

(57) ABSTRACT

An image-forming device includes: a main casing to which a consumable having a consumable memory is attachable; a main memory; a communication interface; and a controller. The main memory is capable of storing: common identification information representing an image-forming device group including the image-forming device and another image-forming device; and settings information including a setting related to an operation of the image-forming device. The controller is configured to perform: in response to determining that the common identification information is stored in the main memory, an acquisition process; and a storage process. In the acquisition process, the controller acquires, from an external device via the communication interface, settings information stored in a main memory of the other image-forming device included in the image-forming device group corresponding to the common identification information. In the storage process, the controller stores the settings information in the main memory of the image-forming device.

9 Claims, 13 Drawing Sheets

| DEVICE ID | DEVICE GROUP ID |
|---|---|
| SN003 | FL01A |
| SN004 | FL01A |
| SN005 | FL01A |
| SN038 | FL01B |
| SN039 | FL01B |
| : | : |

| DEVICE GROUP ID | SETTINGS FILE |
|---|---|
| FL01A | 20220630_XXX |
| FL01B | 20220807_YYY |
| : | : |

| OLD PRINTER DEVICE ID | NEW PRINTER DEVICE ID | DEVICE GROUP ID | OLD PRINTER SETTINGS FILE |
|---|---|---|---|
| SN005 | SN216 | FL01A | 20220630_XXX |
| : | : | : | : |

IMAGE-FORMING DEVICE AND SYSTEM INCLUDING IMAGE-FORMING DEVICE GROUP INCLUDING FIRST AND SECOND IMAGE-FORMING DEVICES, SERVER, AND MANAGEMENT TERMINAL

REFERENCE TO RELATED APPLICATIONS

This application claims priority from Japanese Patent Application No. 2022-174634 filed on Oct. 31, 2022. The entire content of the priority application is incorporated herein by reference.

BACKGROUND ART

In recent years, a wide range of flat-rate printing services have been offered to users of image-forming devices. Also known as subscription services, flat-rate printing services allow users to subscribe to printing services for individual image-forming devices. For example, with a subscribed machine, i.e., an image-forming device for which the user has entered into an agreement to use the flat-rate printing service, printing is allowed at a fixed rate up to a preset number of sheets within a predetermined period of time. For example, a prior art describes one technology for managing subscription consumables in association with subscribed machines so that the subscription consumables are used in specific subscribed machines.

DESCRIPTION

However, there remains room for improvement in the technology disclosed in the prior art for managing subscription consumables in association with subscribed machines. For example, the conventional technology is problematic in that the user must perform cumbersome operations when changing subscribed machines.

In view of the foregoing, it is an object of the present disclosure to provide an image-forming device and system that enables users to transition from an image-forming device they are currently using to the new image-forming device more easily than in the conventional technology.

In order to attain the above and other objects, according to one aspect, the present disclosure provides an image-forming device. The image-forming device includes: a main casing; a main memory; a communication interface; and a controller. A consumable is attachable to the main casing. The consumable has a consumable memory. The main memory is capable of storing: common identification information; and settings information. The common identification information represents an image-forming device group. The image-forming device group includes the image-forming device and another image-forming device that differs from the image-forming device. The settings information includes a setting related to an operation of the image-forming device. The controller is configured to perform: a first determination process; an acquisition process; and a first storage process. In the first determination process, the controller determines whether the common identification information is stored in the main memory of the image-forming device. In response to determining in the first determination process that the common identification information is stored in the main memory of the image-forming device, the controller performs the acquisition process. In the acquisition process, the controller acquires, from an external device via the communication interface, settings information stored in a main memory of the another image-forming device included in the image-forming device group corresponding to the common identification information. In the first storage process, the controller stores the settings information acquired in the acquisition process in the main memory of the image-forming device.

With the image-forming device according to the above-described aspect of the present disclosure, the controller performs the first determination process to determine whether common identification information is stored in the main memory of the image-forming device (hereinafter called the "new device"). When the controller determines in the first determination process that common identification information is stored in the main memory, the controller subsequently acquires settings information stored in a main memory of another image-forming device included in the image-forming device group associated with the common identification information (hereinafter called the "old device") from an external device (hereinafter called the "server") via the communication interface. As a result, the controller can automatically store settings information of the old device in the main memory of the new device. Thus, the user can transition from an old device currently in use to a new device more easily than before.

According to another aspect, the present disclosure also provides a system. The system includes: an image-forming device group; a server; and a management terminal. The image-forming device group includes a first image-forming device and a second image-forming device that differs from the first image-forming device. The server is configured to communicate with each of the first image-forming device and the second image-forming device via a communication network. The management terminal is configured to communicate with the server via the communication network. The first image-forming device includes: a first main memory; and a first controller. The first main memory stores first device identification information. The first device identification information identifies the first image-forming device. The second image-forming device includes: a second main memory; and a second controller. The second main memory stores second device identification information. The second device identification information identifies the second image-forming device. The server includes: a server memory; and a server controller. The server memory is configured to store the first device identification information, the second device identification information, and settings information in association with common identification information. The common identification information identifies the image-forming device group. The settings information includes a setting related to an operation of each of the first image-forming device and the second image-forming device included in the image-forming device group. The second main memory is capable of storing: the common identification information; and settings information. The common identification information represents the image-forming device group in which the second image-forming device is included. The settings information includes a setting related to an operation of the second image-forming device. The server controller is configured to perform: a first determination process; a first storage process; a second determination process; a transmission process. In the first determination process, the server controller determines whether the second device identification information and a replacement request are received via the communication network. The replacement request requests to replace the second image-forming device with the first image-forming device. In response to determining in the first determination process that the second device information and the replacement request are received, the server controller performs the first storage process. In the first storage process, the server controller reads the common identification information stored in the server memory in association with the received second device identification information and stores the read common identification information in the first main memory via the management terminal. In the second determination process, the server controller determines whether the common identification information which is stored in the first main memory in the first storage device is received from the first image-forming device via the communication network. In response to determining in the second determination process that the common identification information is received, the server controller performs the transmission process. In the transmission process, the server controller reads the settings information stored in the server memory in association with the received common identification information and transmits the read settings information to the first image-forming device via the communication network. The first controller is configured to perform: a second storage process. In the second storage process, the first controller stores the settings information received from the server in the first main memory.

With the system according to the above-described aspect of the present disclosure, the user can automatically have settings information of an old device included in the image-forming device group automatically stored in the first main memory of a new device by connecting the new device to the communication network.

FIG. 4 is an explanatory diagram illustrating an example of a device group registration table stored in a server memory of the server.

FIG. 5 is an explanatory diagram illustrating an example of a settings file registration table stored in the server memory of the server.

FIG. 10 is an explanatory diagram illustrating an example of a printer replacement table stored in a server memory of the server.

FIRST EMBODIMENT

Hereinafter, a first embodiment of the present disclosure will be described while referring to FIGS. 1 through 9. The first embodiment describes an example in which image-forming devices 1 are laser printers and image formation performed by the image-forming devices 1 is printing. However, the image-forming devices 1 may be printers other than the laser printers. For example, the image-forming devices 1 may be inkjet printers.

<Overview of Image Formation System>

Figure 1:
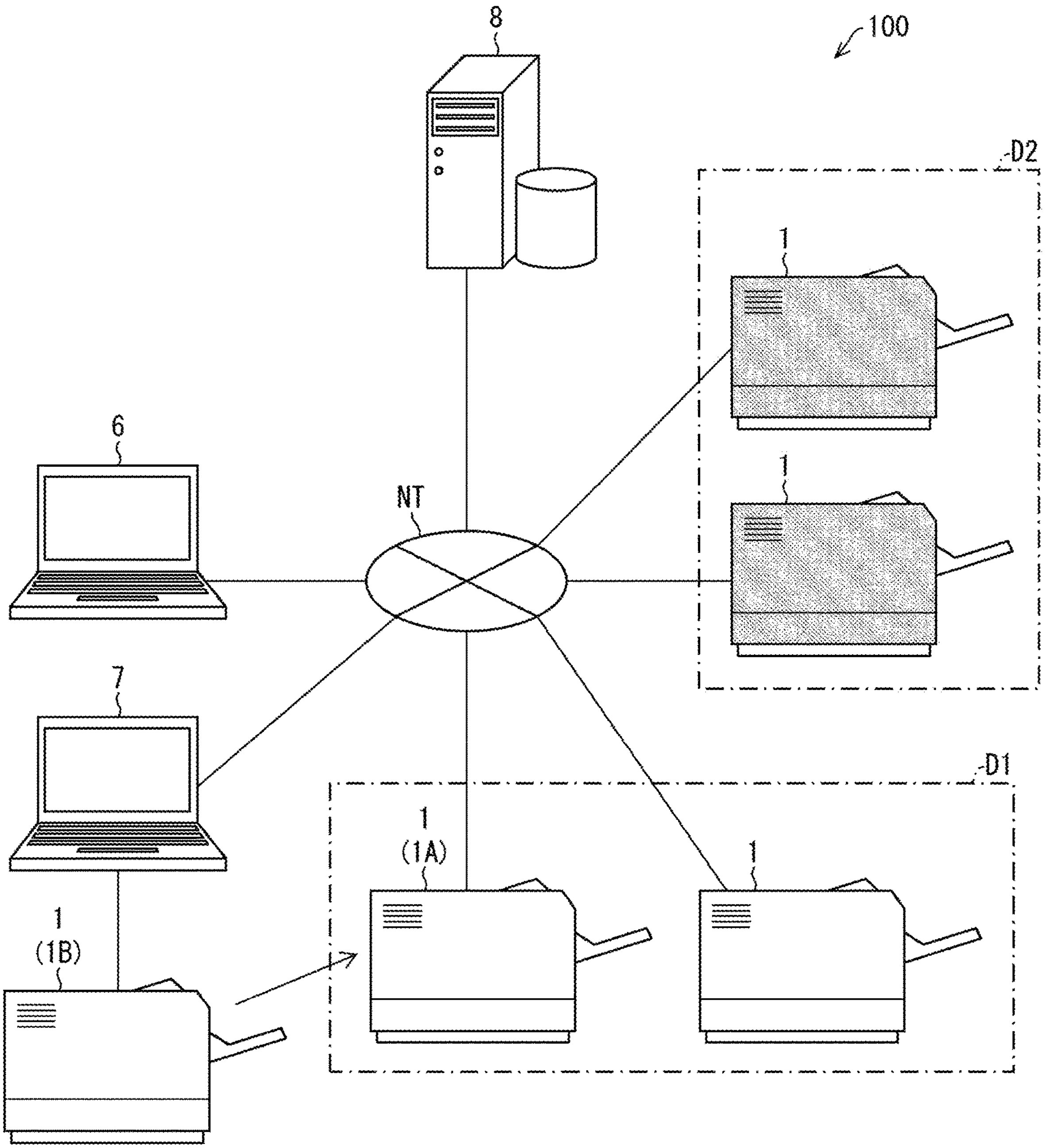
FIG. 1 is a diagram illustrating an overview of an image formation system according to the present disclosure.

FIG. 1 is a diagram illustrating an overview of an image formation system 100 according to the first embodiment. As illustrated in FIG. 1, the image formation system 100 includes a plurality of image-forming devices 1, a server 8, a management terminal 7, and a registration terminal 6. The image-forming devices 1 illustrated in FIG. 1 constitute an image-forming device group D1, an image-forming device group D2, and the like, each of which group comprises a certain image-forming device 1 and other image-forming devices 1 that differ from the certain image-forming device 1. Thus, each of the image-forming device groups D1 and D2 includes a plurality of image-forming devices 1. The image-forming devices 1 of a single group belonging to any one group among the image-forming device groups D1 and D2 are provided by a service provider upon conclusion of an agreement with the same user.

Each of the image-forming devices 1 is a device for implementing a service provided when an agreement is concluded for the image-forming device 1. Specific services provided to image-forming devices 1 of a single group among the image-forming device groups D1 and D2 are applicable only to the image-forming devices 1 in that group. For example, a service that allows the continued use of subscription-based consumables is provided only to image-forming devices 1 belonging to the image-forming device group D1.

The server 8 is an example of an external device that communicates with the image-forming device 1 via a communication network NT and an example of the management device (management server, server) for managing image-forming devices 1. The server 8 and the registration terminal 6 are managed by the service provider and can communicate with each other via the communication network NT. The management terminal 7 is provided at the factory of the service provider, for example. The management terminal 7 is managed by the service provider and can communicate with the server 8 via the communication network NT.

The term "agreement" in the first embodiment indicates a contract concluded between a user and a service provider under which the service provider provides the user with specific services through a plurality of image-forming devices 1 specified by the user or a plurality of image-forming devices 1 provided to the user by the service provider. In other words, individual users essentially conclude an agreement for each of the image-forming device groups D1 and D2 and the like. Additionally, each of the image-forming device groups D1 and D2 and the like can be considered a group of image-forming devices 1 that are the subject of an agreement. In the following description, an image-forming device 1 that is specified by the user or provided to the user by the service provider and that is the subject of an agreement will be referred to as a "subscribed machine."

Through an agreement concluded between the user and the service provider, each group of image-forming devices 1 among the image-forming device groups D1 and D2 can be provided to the user from the service provider to be used by the user for a fixed monthly rate. Furthermore, through an agreement concluded between the user and service provider, each group of image-forming devices 1 can be used with subscription-based consumables for a fixed monthly rate, for example. As an example of an agreement, the service provider providing the subscription service and the user agree on a usage period, a usage fee, and the like of the service, and both parties agree that the service provider will provide this service to the user.

In other words, once an agreement for the service is concluded, the image-forming devices 1 according to the first embodiment can be used based on the terms of the agreement and can execute subscription printing, which is printing using subscription-based consumables under the terms of the concluded agreement. Alternatively, the image-forming devices 1 may be devices capable of executing subscription printing using subscription-based consumables after an agreement for a service is concluded.

The user can register or change an image-forming device 1 serving as a subscribed machine at any time. Here, the term "register" may indicate registering a new image-forming device or re-registering a previously registered image-forming device 1 whose agreement is cancelled. The user can also register a plurality of image-forming devices 1 as a group of subscribed machines, e.g., the image-forming device groups D1 and D2 and the like.

In other words, the user can simultaneously use a plurality of image-forming devices 1 as subscribed machines, and can replace one of the image-forming devices 1 used in the group of subscribed machines with another image-forming device 1. In a case where one of the user's image-forming devices 1 that is a subscribed machine has failed or the like, the service provider sends a new-image-forming device 1 (a new device) registered as a replacement subscribed machine for the same group to the user so that the user can replace the failed image-forming device 1 (an old device) with the new device. The new device is an example of an image-forming device 1 that differs from the failed image-forming device 1.

The registration terminal 6 used by the service provider communicates with the server 8 to register a device ID, which is unique identification information for identifying an image-forming device 1 to be used as a subscribed machine, in association with a device group ID, which is common identification information representing a group of image-forming devices to which this image-forming device 1 belongs. Any information processing terminal provided with standard communication functions, such as a personal computer (PC) or a smartphone, may be employed as the registration terminal 6.

The management terminal 7 used by the service provider is located at the service provider's factory or the like and communicates with the server 8 via the communication network NT. The management terminal 7 receives a device group ID that represents an image-forming device group and is assigned to the new device from the server 8 via the communication network NT. The service provider then operates the management terminal 7 to store the device group ID received by the management terminal 7 in the main memory 62 of the new device (see FIG. 2) before shipping the new device to the user. The management terminal 7 may also transmit a device ID representing unique identification information for the new device and the device group ID to the server 8 via the communication network NT.

<Overall Structure of Image-Forming Device 1>

Figure 2:
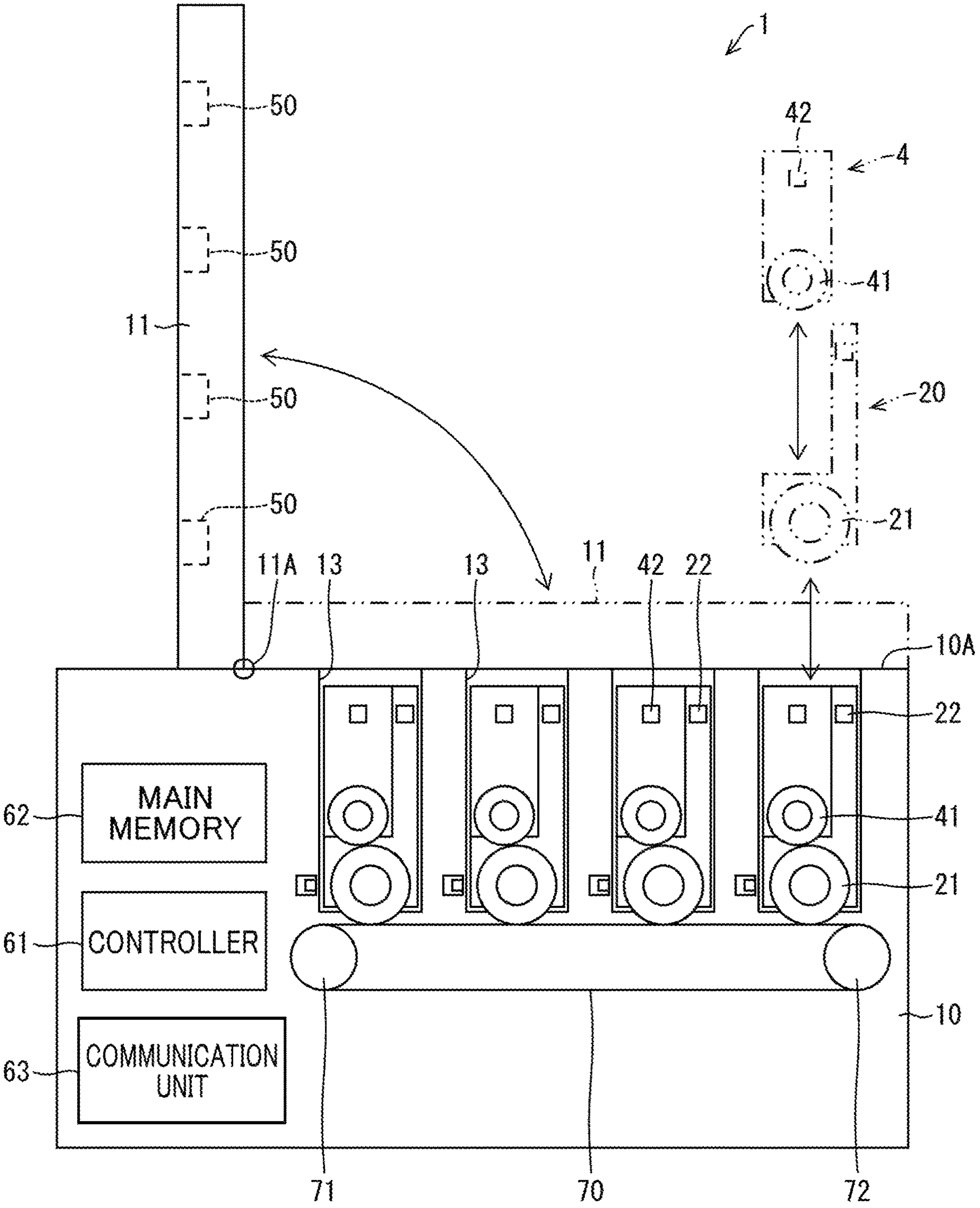
FIG. 2 is a schematic diagram illustrating an image-forming device according to the present disclosure.
Figure 3:
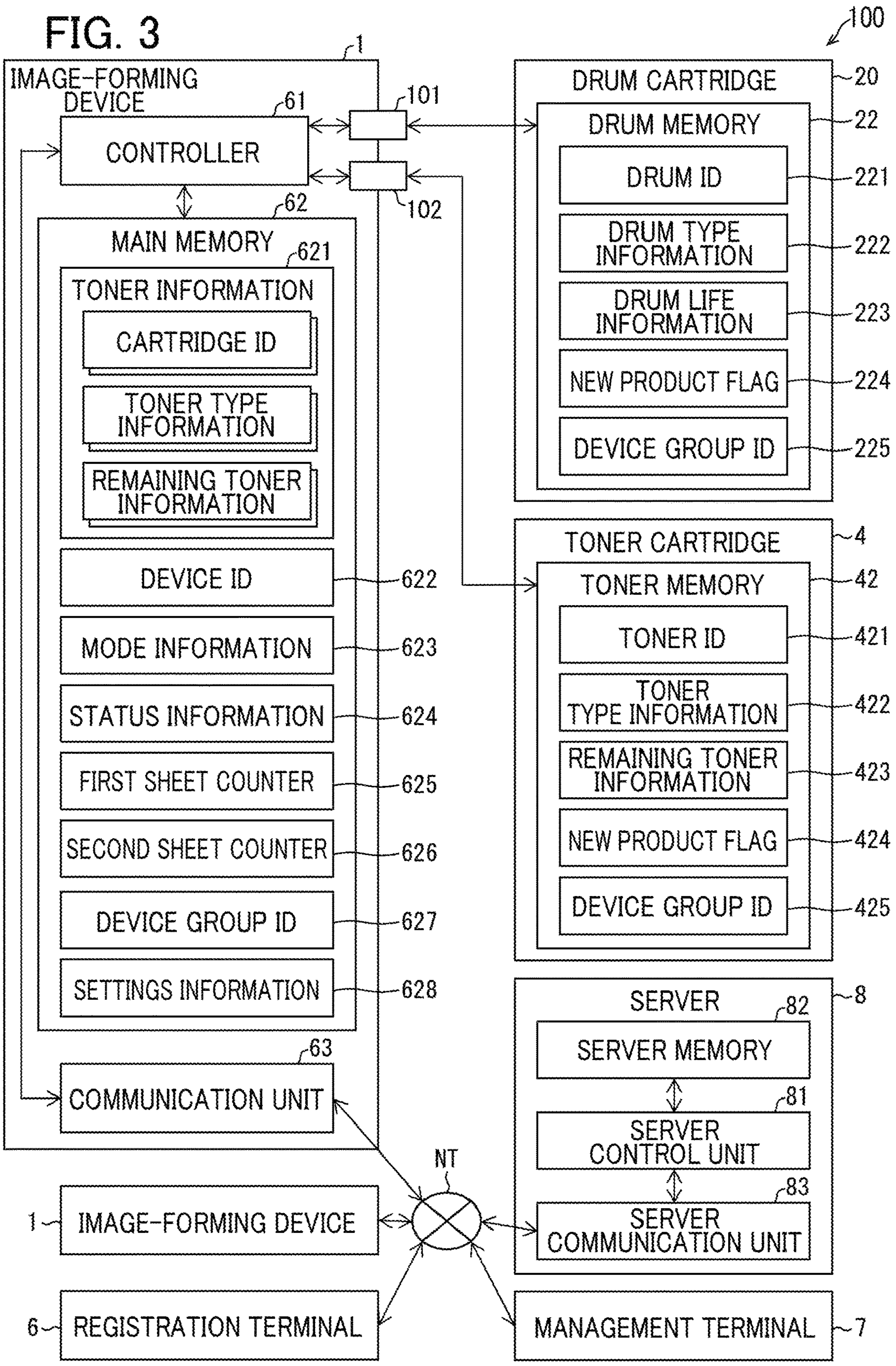
FIG. 3 is a block diagram illustrating: the internal structures of the image-forming device, which includes drum cartridges and toner cartridges, and a server; and the connected relationships among the image-forming device, the server, a registration terminal, and a management terminal.

FIG. 2 is a schematic diagram of the image-forming device 1. FIG. 3 is a diagram illustrating: the internal structures of an image-forming device 1, which includes drum cartridges 20 and toner cartridges 4, and the server 8; and the connected relationships among the image-forming device 1, the server 8, the registration terminal 6, and the management terminal 7. Although FIG. 3 includes two image-forming devices 1, both image-forming devices 1 have similar configurations.

As illustrated in FIG. 2, the image-forming device 1 includes a main casing 10, a cover 11, toner cartridges 4, drum cartridges 20, a controller 61, a main memory 62, and a communication unit 63. Although not illustrated in the drawings, the image-forming device 1 may also include a display unit that includes a liquid crystal display, lamps, and the like; and an input unit that includes buttons and the like. The liquid crystal display may also be integrally configured with a touchscreen and may be configured to function as an input unit.

<Main Casing 10>

The toner cartridges 4 are attachable to the main casing 10 of the image-forming device 1. As will be described later in detail, each of the toner cartridges 4 is attachable to a corresponding one of the drum cartridges 20 to be integrated therewith. That is, the toner cartridge 4 is attachable to the main casing 10 together with the drum cartridge 20 in a state where the toner cartridge 4 is attached to the drum cartridge 20, thereby achieving an image-forming device 1 that includes drum cartridges 20 and toner cartridges 4.

Note that, in the image-forming device 1 according to the present embodiment, four toner cartridges 4 need to be attached to the main casing 10 in order to perform printing. In other words, in the image-forming device 1 according to the present embodiment, four drum cartridges 20 and four toner cartridges 4 are attachable to the main casing 10. However, the numbers of drum cartridges 20 and toner cartridges 4 attachable to the image-forming device 1 are not limited to the example of FIG. 2. For example, the image-forming device 1 may be a monochrome printer that allows the attachment of a single drum cartridge 20 and a single toner cartridge 4.

Each of the toner cartridges 4 accommodates therein toner that is consumed when the image-forming device 1 performs printing. That is, each of the toner cartridges 4 is an example of a consumable for the image-forming device 1. Furthermore, each of the drum cartridges 20 includes a photosensitive drum 21 that is used for printing performed in the image-forming device 1. Each of the drum cartridges 20 is also an example of a consumable for the image-forming device 1.

The main casing 10 has a rectangular-parallelepiped box shape, for example. The four drum cartridges 20, four toner cartridges 4, a transfer belt 70, the controller 61, the main memory 62, and the communication unit 63 are accommodated in the main casing 10. The main casing 10 has four cartridge holders 13. Each of the cartridge holders 13 is formed as a recess and has an opening. The drum cartridges 20 and the toner cartridges 4 are held in corresponding cartridge holders 13 to be attached to the main casing 10.

<Cover 11>

A plurality of light source units 50 are provided corresponding to the drum cartridges 20 at the cover 11 of the image-forming device 1. That is, the image-forming device 1 includes four light source units 50. The cover 11 is pivotally movable (movable) about a pivot shaft 11A extending in a first direction between an open position (a position indicated by solid lines in FIG. 2) in which the cover 11 opens an opening 10A and a closed position (a position indicated by two-dotted chain lines in FIG. 2) in which the cover 11 closes the opening 10A. In other words, the opening 10A provided in an upper end of the main casing 10 is opened and closed in accordance with the pivotal movement of the cover 11.

Note that the "first direction" indicates a direction in which a rotation center axis (a developing axis) of a developing roller 41 in a toner cartridge 4 extends. The openings of the cartridge holders 13 are opened when the cover 11 is in the open position, and are covered by the cover 11 when the cover 11 is in the closed position.

A cover sensor not illustrated in the drawings may be provided at the opening 10A of the main casing 10. The cover sensor is a sensor configured to detect that the cover 11 is in the closed position. The cover sensor may be a contact-type sensor or an optical sensor, for example.

<Toner Cartridges 4>

Each of the toner cartridges 4 includes a developing roller 41, and a cartridge casing that can accommodate therein developer (for example, toner) as an example of the printing material. Each of the cartridge casings of the toner cartridges 4 is attachable to the main casing 10. The four toner cartridges 4 accommodate therein developer in colors different from one another (for example, colors of cyan, magenta, yellow, and black) as the material used for image formation.

The developer is a consumable that becomes depleted during use. The developing roller 41 is a cylindrical member that extends in the first direction and is rotatable about its developing axis extending in the first direction. When the toner cartridge 4 is attached to the corresponding drum cartridge 20, the outer circumferential surface of the photosensitive drum 21 contacts the outer circumferential surface of the developing roller 41.

Each of the toner cartridges 4 also includes a toner memory 42 as an example of a consumable memory. The toner memory 42 is positioned at the outer surface of the toner cartridge 4 at one side in the first direction. The toner memory 42 is a memory to which information is writable and from which information is readable. For example, the toner memory 42 may be a flash read-only memory (flash ROM) or an electrically erasable programmable read-only memory (EEPROM). "EEPROM" is a registered Japanese trademark of Renesas Electronics Corporation.

As illustrated in FIG. 3, each of the toner memories 42 has a first area 421, a second area 422, a third area 423, a fourth area 424, and a fifth area 425 for storing information related to the toner cartridge 4. The toner memory 42 stores a toner ID in the first area 421. The toner memory 42 stores toner type information in the second area 422. The toner memory 42 stores remaining toner information in the third area 423. The toner memory 42 stores a new product flag in the fourth area 424. The toner memory 42 stores a device group ID (the common identification information) in the fifth area 425. Note that each of the third area 423 and the fourth area 424 may be a rewritable area in which data stored therein is rewritable.

The toner ID is an example of unique identification information for identifying an individual toner cartridge 4. The toner ID may be a serial number unique to the individual toner cartridge 4. The toner ID may include information specifying the color of toner accommodated in the toner cartridge 4.

The toner type information is an example of the type information specifying the type of the toner cartridge 4. There are two types of toner cartridges 4 in the present embodiment. The first type is a "special cartridge" that can be used only in a subscribed machine. In other words, a special cartridge is an example of a special consumable that can be used in a state where an agreement concluded for the image-forming device 1 is in effect.

The second type is a "normal cartridge" that can also be used in an image-forming device 1 that does not serve as a subscribed machine. In other words, a normal cartridge is an example of a normal consumable that can be used regardless of whether an agreement is concluded. Note that the toner type information may also be included in the toner ID. That is, the toner ID may simultaneously be information identifying an individual toner cartridge 4 and information specifying the type of the toner cartridge 4.

The remaining toner information indicates the remaining quantity of toner in the toner cartridge 4. In this example, the remaining quantity of toner is a value associated with one of a plurality of levels from full to empty. This value is stored in the third area 423. Each level of the remaining quantity of toner stored in the toner memory 42 may be a character string such as "FULL," "HIGH," "LOW," and "EMPTY" beginning in order from the highest value; may be a numerical value such as "100%" through "0%"; or may be information combining a character string and a numerical value based on the value described above.

The new product flag stored in the fourth area 424 is an example of information indicating whether the toner cartridge 4 is a new product or an old product, i.e., a used product. For example, the value "1" for the new product flag indicates that the toner cartridge 4 is a new product, while the value "0" for the new product flag indicates that the toner cartridge 4 is used. Here, a used product is any consumable that has been attached to the image-forming device 1.

The device group ID stored in the fifth area 425 is information representing the image-forming device group to which a plurality of image-forming devices 1 belong. The controller 61 of the image-forming device 1 allows the use of only toner cartridges 4 that store the device group ID for the image-forming device group to which the image-forming device 1 belongs. The controller 61 of the image-forming device 1 also allows the continued use of a toner cartridge 4 that stores therein the device group ID for the image-forming device group to which the image-forming device 1 belongs, even if the new product flag for the attached toner cartridge 4 indicates that the toner cartridge 4 is an old product.

<Drum Cartridges 20>

Each of the drum cartridges 20 includes a cartridge casing that is attachable to the main casing 10. The cartridge casing includes a photosensitive drum 21 as a component used for image formation. The photosensitive drum 21 is an example of a consumable that needs to be replaced since the outer circumferential surface of the photosensitive drum 21 is deteriorated by wear as the photosensitive drum 21 is used. The photosensitive drum 21 is a cylindrical photosensitive member extending in the first direction. The photosensitive drum 21 is rotatable about a drum axis extending in the first direction. The outer circumferential surface of the photosensitive drum 21 is coated with a photosensitive material.

Each of the drum cartridges 20 may include a drum memory 22 as an example of a consumable memory. The drum memory 22 is a memory to which information is writable and from which information is readable. The drum memory 22 is a flash ROM or an EEPROM (registered Japanese trademark of Renesas Electronics Corporation), for example. As described above, "EEPROM" is a registered Japanese trademark of Renesas Electronics Corporation.

As illustrated in FIG. 3, the drum memory 22 has a first area 221, a second area 222, a third area 223, a fourth area 224, and a fifth area 225 for storing information related to the photosensitive drum 21 of the drum cartridge 20. The drum memory 22 stores a drum ID in the first area 221. The drum memory 22 stores drum type information in the second area 222. The drum memory 22 stores drum life information in the third area 223. The drum memory 22 stores a new product flag in the fourth area 224. The drum memory 22 stores a device group ID (the common identification information) in the fifth area 225. Note that each of the third area 223 and the fourth area 224 may be a rewritable area in which data stored therein is rewritable.

The drum ID is an example of unique identification information for identifying an individual drum cartridge 20. The drum ID may be a serial number unique to the corresponding drum cartridge 20. Drum type information is an example of type information and is information specifying the type of the drum cartridge 20. There are two types of drum cartridges 20 in the present embodiment: a "special cartridge" and a "normal cartridge." Drum life information is information indicating the remaining life of the photosensitive drum 21.

The new product flag stored in the fourth area 224 is an example of information indicating whether the drum cartridge 20 is a new product or an old product, i.e., a used product. For example, the value "1" for the new product flag indicates that the drum cartridge 20 is a new product, while the value "0" for the new product flag indicates that the drum cartridge 20 is an old product.

The device group ID stored in the fifth area 225 is information representing the image-forming device group to which a plurality of image-forming devices 1 belong. The controller 61 of the image-forming device 1 allows the user of only drum cartridges 20 that store the device group ID for the image-forming device group to which the image-forming device 1 belongs. The controller 61 of the image-forming device 1 also allows the continued use of a drum cartridge 20 that stores therein the device group ID for the image-forming device group to which the image-forming device 1 belongs, even if the new product flag for the attached drum cartridge 20 indicates that the drum cartridge 20 is an old product.

<Attachment of Cartridges and Printing Mechanism>

As illustrated in FIG. 2, the drum cartridges 20 and the toner cartridges 4 are attachable to the main casing 10 in a state where the cover 11 is in the open position. In this state, the drum cartridges 20 and the toner cartridges 4 are inserted through the opening 10A into the corresponding cartridge holders 13.

The main casing 10 also includes connectors 101 and connectors 102. In a state where a drum cartridge 20 is inserted into the corresponding cartridge holder 13, the corresponding connector 101 is electrically connected to the drum memory 22 of the drum cartridge 20, thereby enabling the controller 61 in the main casing 10 to communicate with the drum memory 22 of the drum cartridge 20. In a state where a toner cartridge 4 is attached to the main casing 10, the corresponding connector 102 is electrically connected to the toner memory 42 of the toner cartridge 4, thereby enabling the controller 61 in the main casing 10 to communicate with the toner memory 42 of the toner cartridge 4.

The four light source units 50 are attached to the inner surface of the cover 11. The light source units 50 are disposed such that the light source units 50 face the outer circumferential surfaces of the corresponding photosensitive drums 21 in a state where the drum cartridges 20 are attached to the main casing 10 and the cover 11 is in the closed position. Each of the light source units 50 has a plurality of light sources arranged in the first direction. The arranged light sources can irradiate the outer circumferential surface of the corresponding photosensitive drum 21 with light. The light sources are light-emitting diodes (LEDs), for example.

Each of the light source units 50 is electrically connected to the controller 61. The controller 61 controls the light source units 50 on the basis of inputted image data to emit light from the light sources in the light source units 50. The light sources of each of the light source units 50 irradiate the outer circumferential surfaces of the corresponding photosensitive drum 21 with light. As a result, the photosensitive material on the outer circumferential surfaces of the photosensitive drums 21 is exposed to light according to the image data.

The transfer belt 70 is a component configured to transfer developer carried on the outer circumferential surface of each photosensitive drum onto printing paper. The transfer belt 70 is an example of a consumable that needs to be replaced since the outer surface of the transfer belt 70 is deteriorated by wear as the transfer belt 70 is used. The transfer belt 70 is a belt having an annular shape (an endless belt) that can contact each of the photosensitive drums 21. The outer circumferential surfaces of the photosensitive drums 21 can contact the outer surface of the transfer belt 70. During a printing process, printing paper is conveyed between the transfer belt 70 and the photosensitive drums 21.

The transfer belt 70 is looped over a drive roller 71 and a follow roller 72. The drive roller 71 drives the transfer belt 70 to circularly move. The controller 61 controls the drive roller 71 to rotate. The follow roller 72 rotates along with the circular movement of the transfer belt 70 according to the drive of the drive roller 71.

<Internal Structure of Main Casing>

The controller 61 has an application-specific integrated circuit (ASIC), for example. The controller 61 is electrically connected to the main memory 62 and the communication unit 63 provided in the main casing 10. The controller 61 executes various processes for controlling the image-forming device 1 to perform a printing process and its related processes.

The controller 61 may also include a processor, such as a CPU. In this case, a control program for implementing a print control method may be stored in the main memory 62. A printing process may be executed in the image-forming device 1 by the processor of the controller 61 performing operations according to the control program stored in the main memory 62.

The controller 61 itself may also include a computer-readable storage medium that stores therein the control program. The storage medium may be a "non-transitory, tangible medium," such as a read-only memory (ROM), a tape, a disc, a card, a semiconductor memory, or a programmable logic circuit. Alternatively, a random-access memory (RAM) or the like may also be used for developing the control program.

The control program may also be supplied to the computer via any transmission medium (a communication network, broadcast waves, etc.) capable of transmitting the control program. Note that, according to one aspect of the present disclosure, the control program can be implemented in the form of data signals embedded in a carrier wave embodied in electronic transmission.

When the drum cartridges 20 and the toner cartridges 4 are attached to the cartridge holders 13 of the main casing 10, the drum memories 22 and the cartridge memories 42 are electrically connected to the controller 61 via connectors 101 and 102, as illustrated in FIG. 3. In this state, the controller 61 can execute a read process for reading information from the connected drum memories 22 and cartridge memories 42, and a write process and/or a rewrite process for writing or rewriting information to the drum memories 22 and the cartridge memories 42.

The main memory 62 is a memory to which information is writable and from which information is readable. The main memory 62 is a flash ROM, an EEPROM, or a non-volatile random-access memory (NVRAM), for example. As described above, "EEPROM" is a registered Japanese trademark of Renesas Electronics Corporation. The main memory 62 has a first area 621 that stores therein toner information, a second area 622 that stores a device ID, a third area 623 that stores therein mode information, and a fourth area 624 that stores therein status information. The main memory 62 also has a fifth area 625 that stores therein a first sheet counter, and a sixth area 626 that stores therein a second sheet counter. The main memory 62 also has a seventh area 627 that stores therein a device group ID (the common identification information), and an eighth area 628 that stores therein settings information.

Toner information is information related to individual toner cartridges 4 attached to the image-forming device 1. For example, the toner information may be data associating a toner ID read from a certain toner memory 42 with toner type information and remaining toner information read from the same toner memory 42. The main memory 62 may store this associated data in the first area 621 for each of the toner cartridges 4. The device ID is an example of device identification information identifying an individual image-forming device 1. The device ID may be a serial number unique to the corresponding image-forming device 1.

The mode information indicates an operating mode of the image-forming device 1. In the present embodiment, the mode information indicates one of two types of modes: a "subscription mode" indicating that the image-forming device 1 is registered as a subscribed machine, and a "normal mode" indicating that the image-forming device 1 is not registered as a subscribed machine or that the agreement for the image-forming device 1 is cancelled.

In other words, the subscription mode indicates that the image-forming device 1 operates in the image formation system 100 as a subscribed machine for which an agreement is entered and in effect. The normal mode indicates that the image-forming device 1 is not a subscribed machine but operates as a normal image-forming device for which no contract is entered or in effect. When the image-forming device 1 is shipped from the factory, a value corresponding to the normal mode is stored in the third area 623 as the initial value. The controller 61 rewrites this mode information as needed. Note that when the image-forming device 1 is shipped to the user from the factory or the like as a replacement machine for a failed subscribed machine, a value corresponding to the subscription mode is stored in the third area 623 as the initial value.

Status information is information that indicates whether a failure occurs in the image-forming device 1. For example, the status information in the present embodiment may include an abnormality flag indicating whether the image-forming device 1 is normal or abnormal, and abnormality information specifying details of the abnormality when the abnormality flag indicates that the image-forming device 1 is abnormal. By referencing the status information, the controller 61 can determine whether a failure occurs in the image-forming device 1.

The first sheet counter indicates the cumulative number of sheets printed in the image-forming device 1. The second sheet counter indicates the number of sheets of printed matter printed in the image-forming device 1 through the subscription printing. The count of the second sheet counter may be reset to 0 (zero) each time the image-forming device 1 shifts from the subscription mode to the normal mode or may be the cumulative number of sheets of printed matter printed to date in the image-forming device 1 through the subscription printing.

The device group ID is an example of common identification information that represents an image-forming device group including this image-forming device 1 and other image-forming devices 1. Since a device group ID is stored in the main memory 62 of each of the image-forming devices 1, the service provider of the image-forming devices 1 can manage image-forming devices 1 in a plurality of image-forming device groups. Additionally, the user can use a plurality of image-forming devices 1 with a common device group ID.

The settings information represents settings for operations of the image-forming device 1. For example, the settings information includes at least one setting selected from a plurality of settings including the following settings for: single-sided printing, double-sided printing for long-edge binding, double-sided printing for short-edge binding, print all pages, print current page, print specified range of pages, print one copy, portrait printing, landscape printing, A4 paper, A3 paper, standard margin settings, narrow margin settings, wide margin settings, print one page per sheet, and print two pages per sheet.

The communication unit 63 is a communication interface for conducting communications between the image-forming device 1 and the server 8 via the communication network NT. The communication unit 63 outputs various data, notifications, and requests received from the server 8 to the controller 61. The communication unit 63 also transmits various data, notifications, and requests inputted from the controller 61 to the server 8.

<Registration Terminal 6>

The registration terminal 6 receives operations for inputting a device ID identifying the image-forming device 1, and a device group ID representing the image-forming device group to which the image-forming device 1 belongs. The registration terminal 6 associates the device ID and device group ID received through these input operations and transmits the IDs to the server 8 via the communication network NT to be registered as a subscribed machine.

The registration terminal 6 also receives an inputted settings file that includes data for settings information, and an inputted device group ID. The settings information represents settings related to operations of the image-forming device 1 that belongs to the image-forming device group.

The registration terminal 6 transmits the received settings file and device group ID to the server 8 via the communication network NT as a settings file registration request. As a result, the server 8 registers the received settings file and device group ID in a settings file registration table 822 described later (see FIG. 5).

<Management Terminal 7>

The management terminal 7 located at the service provider's factory or the like receives notifications from the server 8 via a management terminal communication unit. When the service provider receives a notification via the management terminal 7 for replacing an old device that has failed or the like (hereinafter referred to as the "old printer 1A") and the device group ID to which the old printer 1A belongs, the service provider prepares a new device to replace the old printer 1A (hereinafter the new device will be referred to as a "new printer 1B"). The service provider then transmits the device ID of the new printer 1B, such as a serial number, a model number, and other replacement printer information to the server 8 via the management terminal 7 as information related to the new subscribed machine. The service provider also stores the received device group ID in the new printer 1B via the management terminal 7 and ships the new printer 1B to the user.

<Server 8>

The server 8 is a management device that manages an operation status of the image-forming device 1. The server 8 includes a server communication unit 83, a server memory 82, and a server control unit 81. The server control unit 81 is a central processing unit (CPU) that performs overall control of the server 8. The server memory 82 is a storage device that stores therein data required for operations in the server 8.

The server memory 82 stores therein a device group registration table 821 illustrated in FIG. 4, for example. The device group registration table 821 is configured of device IDs and device group IDs. In the example of FIG. 4, image-forming devices 1 having device IDs "SN003-005" are one image-forming device group since the device IDs "SN003-005" are managed by the common device group ID "FL01A."

The server memory 82 also stores therein a settings file registration table 822 illustrated in FIG. 5, for example. The settings file registration table 822 is configured of device group IDs, and settings files. In the example of FIG. 5, the settings file corresponding to device group ID "FL01A" is managed as "20220630 XXX." More specifically, when a setting for double-sided printing for short-edge binding is set as settings information in the settings file "20220630 XXX," for example, image-forming devices 1 having device group ID "FL01A" are configured to perform double-sided printing for short-edge binding.

The server communication unit 83 is a communication interface for conducting communications among the image-forming devices 1, the registration terminal 6, and the management terminal 7 via the communication network NT. The server communication unit 83 outputs various data, notifications, and requests received from the image-forming devices 1, the registration terminal 6, and the management terminal 7 to the server control unit 81. The server communication unit 83 transmits various data, notifications, and requests inputted from the server control unit 81 to the image-forming devices 1, the registration terminal 6, and the management terminal 7.

For example, when the server control unit 81 receives a device ID and a device group ID from the registration terminal 6 via the server communication unit 83, the server control unit 81 reads the device group registration table 821 illustrated in FIG. 4 from the server memory 82. The server control unit 81 then registers (stores) the received device ID and device group ID in association with each other in the device group registration table 821. Subsequently, the server control unit 81 re-stores the updated device group registration table 821 in the server memory 82.

The server control unit 81 also receives a device ID and a settings file that includes data for settings information from the registration terminal 6 via the server communication unit 83. Subsequently, the server control unit 81 reads the settings file registration table 822 illustrated in FIG. 5 from the server memory 82. The server memory 82 then registers (stores) the received device group ID and settings file in association with each other in the settings file registration table 822. Thereafter, the server control unit 81 re-stores the updated settings file registration table 822 in the server memory 82.

<Process when Replacing Image-Forming Device 1>

Next, steps in a process performed in each device in the image formation system 100 when an image-forming device 1 registered as a subscribed machine is replaced due to a failure or the like will be described with reference to FIGS. 6 through 9.

In the following description, an image-forming device 1 that is currently under an agreement but has failed or the like will be called the "old printer 1A" (see FIG. 1). Additionally, the controller 61 of the old printer 1A will be called the "controller 61A." Further, the image-forming device 1 that will replace this old printer 1A and that is the subject of a new agreement will be called the "new printer 1B" (see FIG. 1). Additionally, the controller 61 of the new printer 1B will be called the "controller 61B." In this example, the old printer 1A belongs to the image-forming device group D1, as illustrated in FIG. 1.

<Failure Notification Process Executed by Old Printer 1A>

Figure 6:
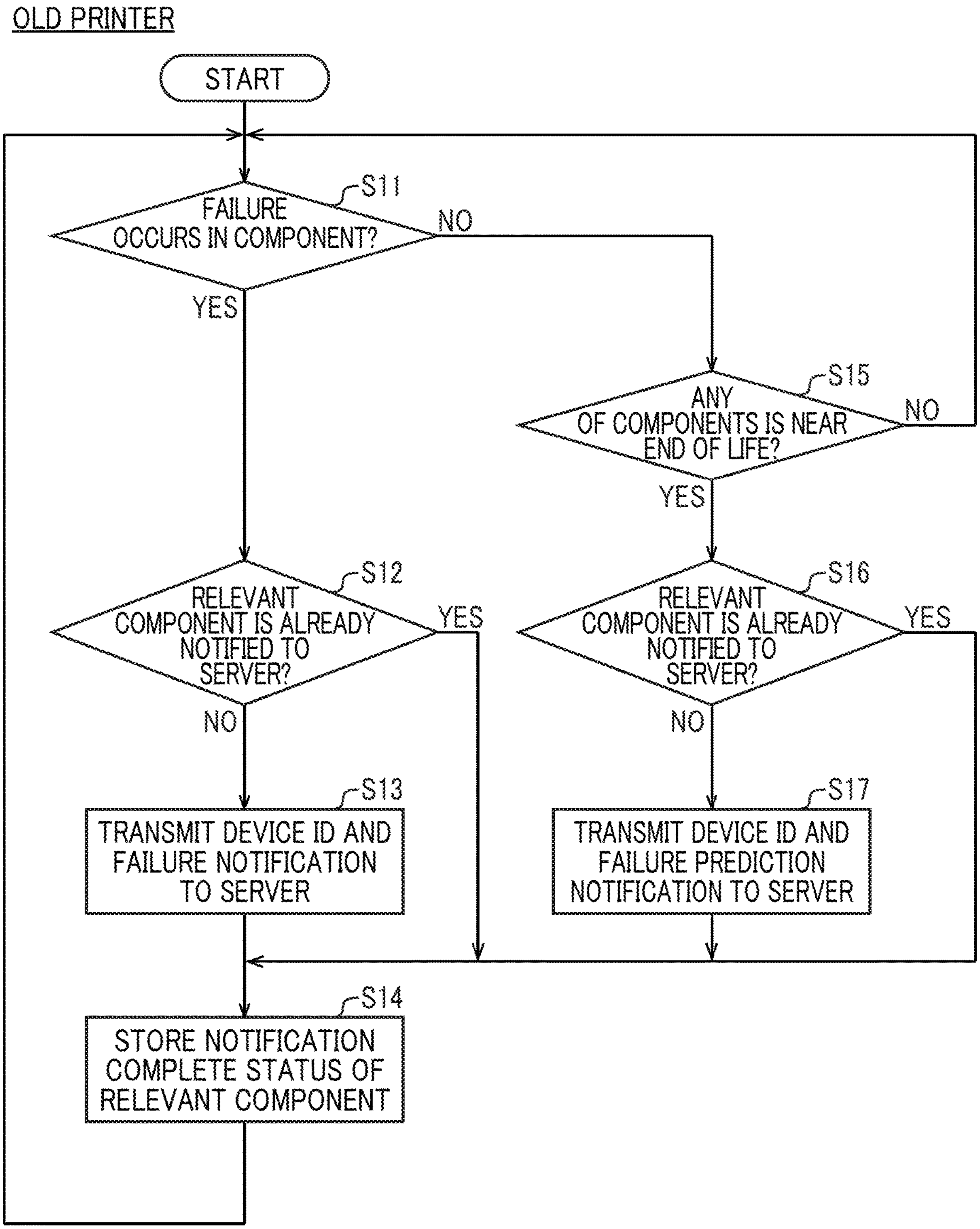
FIG. 6 is a flowchart illustrating an example of steps in a failure notification process executed by a controller of an old printer.

First, steps in a failure notification process executed by the controller 61A of the old printer 1A will be described with reference to FIG. 6. FIG. 6 is a flowchart illustrating an example of steps in the failure notification process executed by the controller 61A of the old printer 1A. A program for implementing the process illustrated in FIG. 6 is stored in the main memory 62. The controller 61A of the old printer 1A executes the process illustrated in FIG. 6 at prescribed intervals, such as intervals of several milliseconds to several tens of milliseconds.

In S11 of FIG. 6, the controller 61A reads status information from the fourth area 624 of the main memory 62 to determine whether the old printer 1A needs to be replaced with the new printer 1B due to a failure occurring in a component of the old printer 1A. When the controller 61A determines that the old printer 1A needs to be replaced due to a failure occurring in a component of the old printer 1A (S11: YES), the controller 61A advances to S12.

In S12 the controller 61A determines whether a failure notification including information identifying the failed component is already transmitted to the server 8. When the controller 61A determines that a failure notification including information identifying the failed component is already transmitted to the server 8 (S12: YES), the controller 61A advances to S14 described later. However, when the controller 61A determines that a failure notification including information identifying the failed component is not transmitted to the server 8 (S12: NO), the controller 61A advances to S13.

In S13 the controller 61A reads the device ID from the second area 622 of the main memory 62. In S13 the controller 61A transmits the device ID of the old printer 1A and a failure notification including information identifying the failed component to the server 8 via the communication unit 63. In S14 the controller 61A stores notification complete status in the main memory 62 indicating that a failure notification including information identifying the failed component is already transmitted and subsequently returns to S11.

On the other hand, when the controller 61A determines in S11 that no failure occurs in components of the old printer 1A (S11: NO), in S15 the controller 61A determines whether any of the components is near the end of life. For example, the maximum cumulative number of printed sheets to reach the end of life for each component is stored in the main memory 62. The controller 61A compares the first print counter stored in the fifth area 625 with the maximum cumulative number of printed sheets for each component to determine whether the component is near the end of life.

When the controller 61A determines that there are no components that are near their end of life (S15: NO), the controller 61A returns to S11. However, when the controller 61A determines that any of the components is near the end of life (S15: YES), the controller 61A advances to S16. In S16 the controller 61A determines whether a failure prediction notification including information identifying the component that is near the end of life is already transmitted to the server 8. When the controller 61A determines that a failure prediction notification including information identifying the component nearing the end of life is already transmitted to the server 8 (S16: YES), the controller 61A advances to S14.

However, when the controller 61A determines that a failure prediction notification including information identifying the component that is near the end of life is not yet transmitted to the server 8 (S16: NO), the controller 61A advances to S17. In S17 the controller 61A reads the device ID from the second area 622 of the main memory 62. In S17 the controller 61A transmits the device ID of the old printer 1A and a failure prediction notification including information identifying the component that is near the end of life to the server 8, and subsequently advances to S14.

In S14 the controller 61A stores a notification complete status in the main memory 62 indicating that a failure prediction notification including information identifying the component that is near the end of life is already transmitted to the server 8, and subsequently returns to S11 described above. Thus, when the old printer 1A needs to be replaced due to a failure or the like, the controller 61A of the old printer 1A can notify the server 8 of this status.

<Replacement Process Executed by Server 8>

Figure 7:
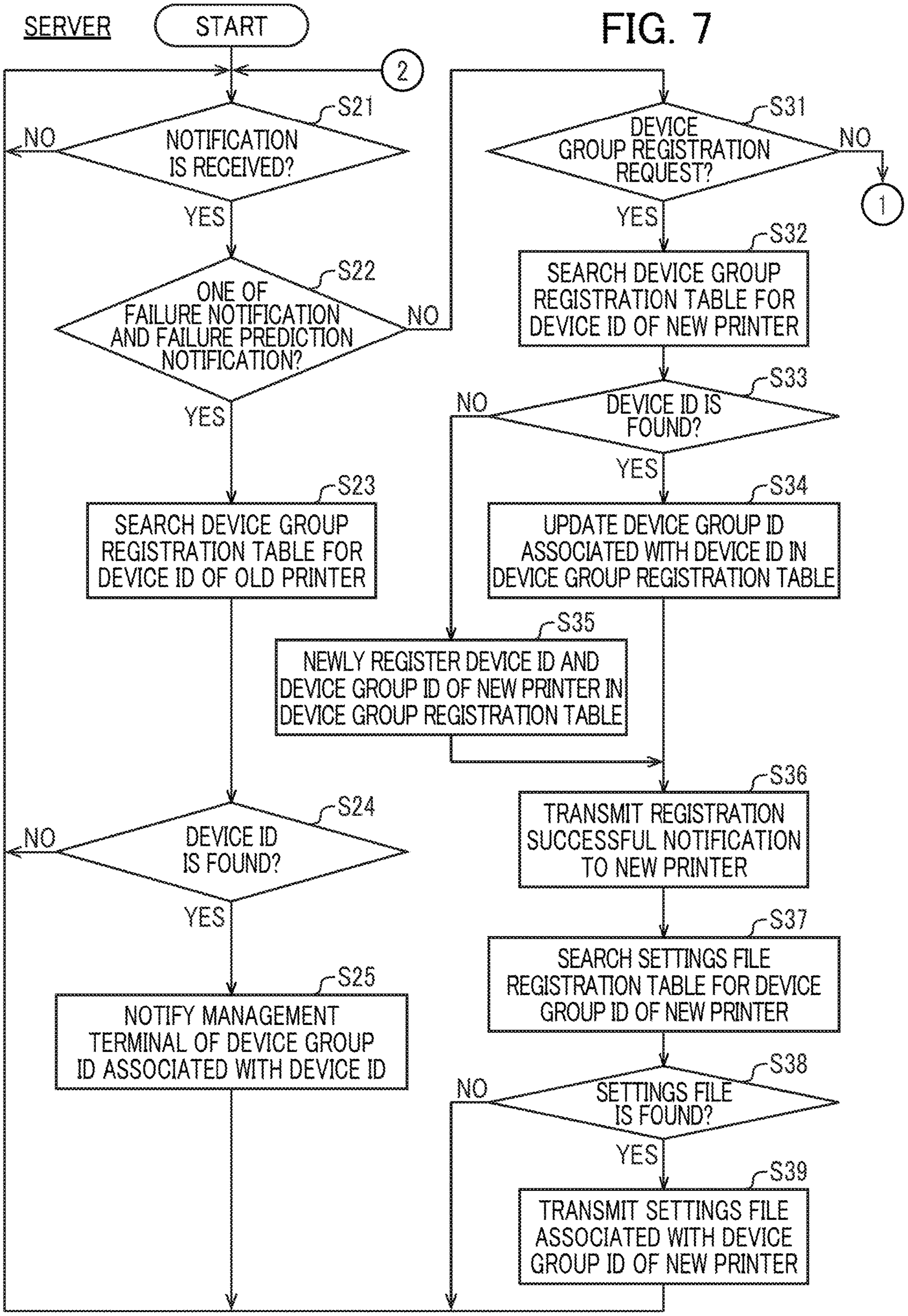
FIG. 7 is a flowchart illustrating a first part of an example of steps in a replacement process executed by a server control unit of the server when an old printer is replaced with a new printer.
Figure 8:
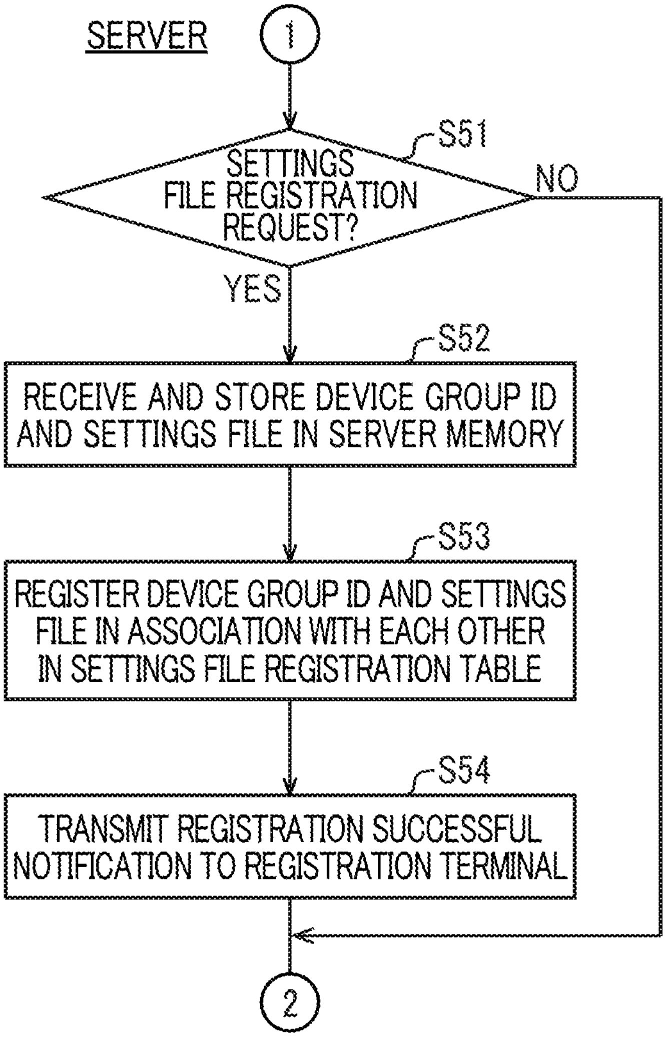
FIG. 8 is a flowchart illustrating a second part of the example of the steps in the replacement process executed by the server control unit of the server when an old printer is replaced with a new printer.

Next, steps in a replacement process executed by the server control unit 81 of the server 8 will be described with reference to FIGS. 7 and 8. FIGS. 7 and 8 are flowcharts illustrating an example of steps in a replacement process executed when an old printer 1A is replaced with a new printer 1B. A program for implementing the process illustrated in FIGS. 7 and 8 is stored in the server memory 82. The server control unit 81 executes the process illustrated in FIGS. 7 and 8 at prescribed intervals, such as intervals from several milliseconds to several tens of milliseconds.

In S21 of FIG. 7, the server control unit 81 determines whether a notification of a process request is received from the old printer 1A, the new printer 1B, or the registration terminal 6 via the server communication unit 83. When the server control unit 81 determines that a notification of a process request is not received from the old printer 1A, the new printer 1B, or the registration terminal 6 via the server communication unit 83 (S21: NO), the server control unit 81 returns to S21. However, when the server control unit 81 determines that a notification of a process request is received from the old printer 1A, the new printer 1B, or the registration terminal 6 via the server communication unit 83 (S21: YES), the server control unit 81 advances to S22.

In S22 the server control unit 81 determines whether the received notification of a process request is one of a failure notification and a failure prediction notification from the old printer 1A. When the server control unit 81 determines that the received notification of a process request is one of a failure notification and a failure prediction notification (S22: YES), the server control unit 81 stores the received failure notification or failure prediction notification in the server memory 82 together with the device ID of the old printer 1A received together with the notification. In S23 the server control unit 81 searches the "DEVICE ID" column of the device group registration table 821 (see FIG. 4) stored in the server memory 82 for the device ID of the old printer 1A received together with the failure notification or failure prediction notification. Subsequently, the server control unit 81 advances to S24.

In S24 the server control unit 81 determines whether the device ID of the old printer 1A is found in the "DEVICE ID" column of the device group registration table 821. When the server control unit 81 determines that the device ID of the old printer 1A is not found in the "DEVICE ID" column of the device group registration table 821 (S24: NO), the old printer 1A determines that the old printer 1A does not belong to any image-forming device group. In this case, the server control unit 81 returns to S21 described above.

On the other hand, when the server control unit 81 determines that the device ID of the old printer 1A is found in the "DEVICE ID" column of the device group registration table 821 (S24: YES), the server control unit 81 determines that the old printer 1A belongs to one of the image-forming device groups. In this case, the server control unit 81 advances to S25.

In S25 the server control unit 81 reads the device group ID associated with the device ID of the old printer 1A from the device group registration table 821 as the device group ID that identifies the image-forming device group to which the old printer 1A belongs. Next, in S25 the server control unit 81 notifies the management terminal 7 of the device group ID associated with the device ID of the old printer 1A and information indicating that the old printer 1A needs to be replaced via the server communication unit 83. Subsequently, the server control unit 81 returns to S21 and repeats the above process.

Thus, as described above, when the service provider receives the notification for replacing the old printer 1A and the device group ID to which the old printer 1A belongs via the management terminal 7, the service provider prepares the new printer 1B to replace the old printer 1A. Next, the service provider transmits the device ID stored in the second area 622 of the main memory 62 in the newly prepared new printer 1B, such as a serial number, a model number, and other information related to the replacement printer, to the server 8 via the management terminal 7 as information related to the new subscribed machine. The service provider also stores the device group ID received via the management terminal 7 in the seventh area 627 of the main memory 62 on the new printer 1B before shipping the new printer 1B to the user.

On the other hand, when the server control unit 81 determines in S22 that the received notification is neither a failure notification nor a failure prediction notification (S22: NO), the server control unit 81 advances to S31.

In S31 the server control unit 81 determines whether the received notification is a notification of a device group registration request that includes a device ID identifying the new printer 1B and a device group ID identifying the image-forming device group to which the new printer 1B belongs. When the server control unit 81 determines that the received notification is a notification of a device group registration request from the new printer 1B (S31: YES), the server control unit 81 advances to S32.

In S32 the server control unit 81 searches the "DEVICE ID" column of the device group registration table 821 for the device ID of the new printer 1B included in the received device group registration request. In S33 the server control unit 81 determines whether the device ID of the new printer 1B is found in the "DEVICE ID" column of the device group registration table 821.

When the server control unit 81 determines that the device ID of the new printer 1B included in the received device group registration request is found (S33: YES), the server control unit 81 advances to S34. In S34 the server control unit 81 rewrites the device group ID in the device group registration table 821 associated with the device ID of the new printer 1B with the device group ID included in the received device group registration request to update the device group registration table 821. Subsequently, the server control unit 81 advances to S36 described later.

Here, when the new printer 1B is a device returned to the factory or the like by another user, the device ID of the new printer 1B may already be registered in the device group registration table 821 with a device group ID representing another image-forming device group. When components of the new printer 1B that have failed or are near their end of life are replaced with new components and the new printer 1B is shipped from the factory as a replacement machine, the server 8 can manage the new printer 1B as an image-forming device 1 belonging to a new image-forming device group.

On the other hand, when the server control unit 81 determines in S33 that the device ID of the new printer 1B included in the received device group registration request is not found (S33: NO), the server control unit 81 advances to S35. In S35 the server control unit 81 performs a new registration by associating and storing the device ID and the device group ID of the new printer 1B included in the received device group registration request in the device group registration table 821 stored in the server memory 82. Subsequently, the server control unit 81 advances to S36.

In S36 the server control unit 81 transmits a registration successful notification to the new printer 1B via the server communication unit 83 indicating that the new printer 1B is newly registered in the device group registration table 821, and subsequently advances to S37. In S37 the server control unit 81 searches the "DEVICE GROUP ID" column of the settings file registration table 822 (see FIG. 5) stored in the server memory 82 for the device group ID of the new printer 1B, and subsequently advances to S38.

In S38 the server control unit 81 determines whether the device group ID of the new printer 1B is found in the "DEVICE GROUP ID" column of the settings file registration table 822. In other words, the server control unit 81 determines whether a settings file associated with the device group ID of the new printer 1B is found in the "SETTINGS FILE" column of the settings file registration table 822.

When the server control unit 81 determines that a settings file associated with the device group ID of the new printer 1B is found in the "SETTINGS FILE" column of the settings file registration table 822 (S38: YES), the server control unit 81 advances to S39. In S39 the server control unit 81 reads data for the settings information included in the settings file associated with the device group ID of the new printer 1B from the settings file registration table 822. Next, the server control unit 81 transmits the settings file including this data for the settings information to the new printer 1B via the server communication unit 83. Subsequently, the server control unit 81 returns to S21 and repeats the above process.

However, when the server control unit 81 determines that a settings file associated with the device group ID of the new printer 1B is not found (S38: NO), the server control unit 81 returns to S21 described above.

On the other hand, when the server control unit 81 determines in S31 that the received notification is not a notification of a device group registration request from the new printer 1B (S31: NO), the server control unit 81 advances to S51 illustrated in FIG. 8.

As illustrated in FIG. 8, in S51 the server control unit 81 determines whether the received notification is a notification of a settings file registration request that includes a device group ID and a settings file. When the server control unit 81 determines that the received notification is not a notification of a settings file registration request from the registration terminal 6 (S51: NO), the server control unit 81 returns to S21 of FIG. 7 and repeats the above process.

However, when the server control unit 81 determines that the received notification is a notification of a settings file registration request from the registration terminal 6 (S51: YES), the server control unit 81 advances to S52. In S52 the server control unit 81 stores the device group ID and the settings file included in the received notification of the settings file registration request in the server memory 82 and subsequently advances to S53.

In S53 the server control unit 81 registers (stores) the device group ID and the settings file included in the received notification of the settings file registration request in association with each other in the settings file registration table 822 stored in the server memory 82, and subsequently advances to S54. In S54 the server control unit 81 transmits a registration successful notification to the registration terminal 6 via the server communication unit 83 indicating that the device group ID and the settings file are newly registered in the settings file registration table 822. Subsequently, the server control unit 81 returns to S21 of FIG. 7 described above.

<Setting Process Executed by New Printer 1B>

Figure 9:
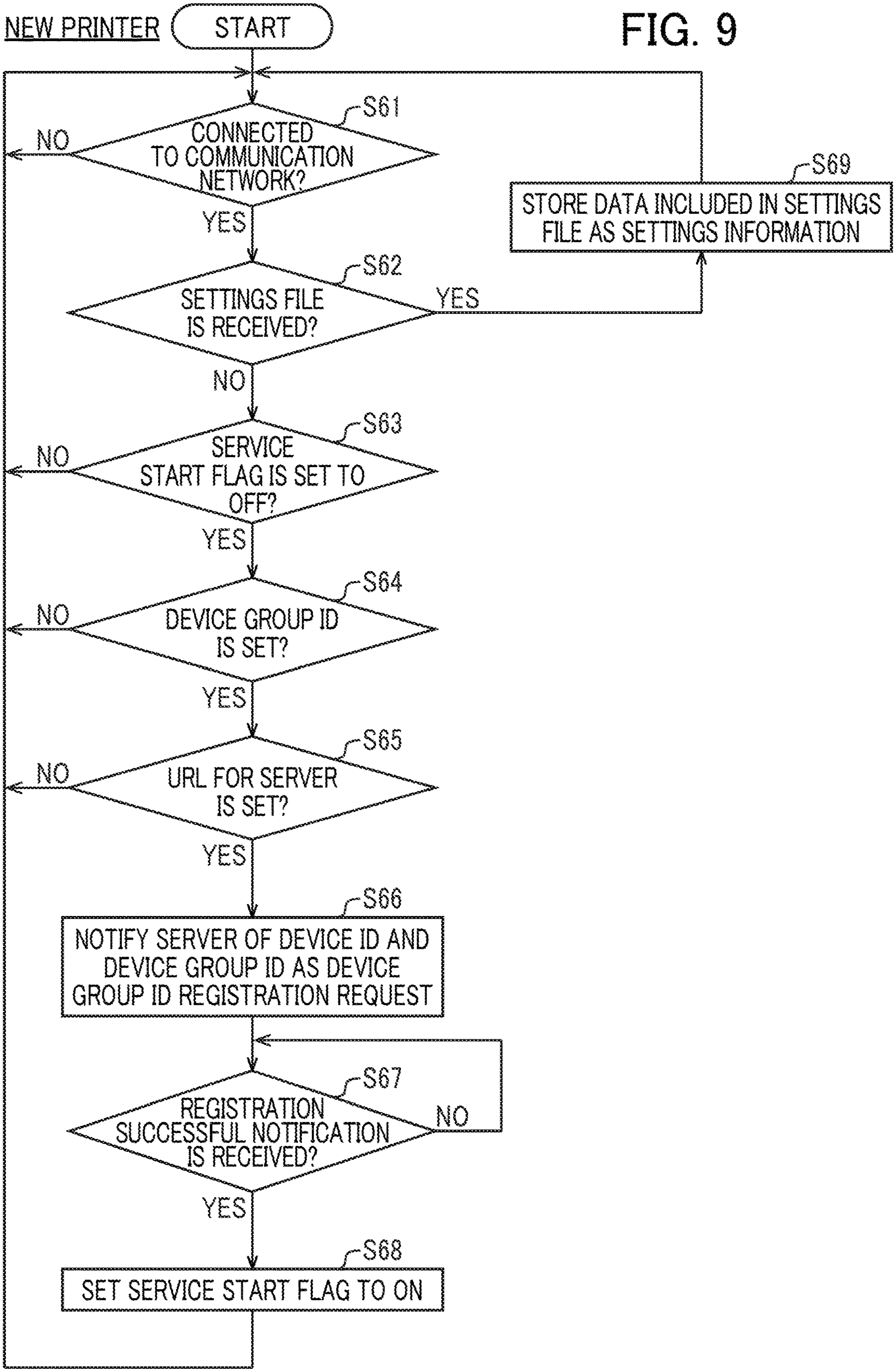
FIG. 9 is a flowchart illustrating an example of steps in a setting process executed by a controller of a new printer delivered to a user when replacing an old printer.

Next, steps in a process performed in the new printer 1B delivered to the user will be described with reference to FIG. 9. FIG. 9 is a flowchart illustrating an example of steps in a setting process executed by the controller 61B of the new printer 1B delivered to the user when the old printer 1A is replaced with the new printer 1B. A program implementing the process illustrated in FIG. 9 is stored in the main memory 62. The controller 61B of the new printer 1B executes the process illustrated in FIG. 9 at prescribed intervals, such as intervals of several milliseconds to several tens of milliseconds.

As illustrated in FIG. 9, in S61 the controller 61B determines whether the new printer 1B is connected to the communication network NT via the communication unit 63. When the controller 61B determines that the new printer 1B is not connected to the communication network NT via the communication unit 63 (S61: NO), the controller 61B continues to repeat the determination in S61. When the controller 61B determines that the new printer 1B is connected to the communication network NT via the communication unit 63 (S61: YES), the controller 61B advances to S62.

In S62 the controller 61B determines whether a settings file including data for settings information representing settings related to operations of the new printer 1B is received from the server 8 via the communication unit 63. When the controller 61B determines that a settings file including data for settings information representing settings related to operations of the new printer 1B is not received from the server 8 (S62: NO), the controller 61B advances to S63.

In S63 the controller 61B reads a service start flag from the main memory 62 indicating whether subscription printing using special toner cartridges 4 is permitted and determines whether the service start flag is set to OFF. When the new printer 1B is shipped from the factory or the like, the service start flag is set to OFF as default and stored in the main memory 62. When the service start flag is set to OFF, subscription printing using special toner cartridges 4 is prohibited. On the other hand, when the service start flag is set to ON, subscription printing using special toner cartridges 4 is permitted.

When the controller 61B determines that the service start flag is set to ON (S63: NO), the controller 61B returns to S61 and repeats the above process. However, when the controller 61B determines that the service start flag is set to OFF (S63: YES), the controller 61B advances to S64.

In S64 the controller 61B determines whether a device group ID is set (stored) in the seventh area 627 of the main memory 62. When the new printer 1B is shipped from the factory or the like, "subscription mode" is stored in the third area 623 of the main memory 62 to indicate that the new printer 1B is registered as a subscribed machine. Also, when the new printer 1B is shipped from the factory or the like, a device group ID identifying the image-forming device group to which the new printer 1B belongs is set (stored) in the seventh area 627 of the main memory 62.

When the controller 61B determines that a device group ID is not set in the seventh area 627 of the main memory 62 (S64: NO), the controller 61B returns to S61 and repeats the above process. However, when the controller 61B determines that a device group ID is set in the seventh area 627 of the main memory 62 (S64: YES), the controller 61B advances to S65.

In S65 the controller 61B determines whether a URL for the server 8 on the communication network NT is stored (set) in the main memory 62. When the controller 61B determines that a URL for the server 8 is not set in the main memory 62 (S65: NO), the controller 61B returns to S61 and repeats the above process. However, when the controller 61B determines that a URL for the server 8 is set in the main memory 62 (S65: YES), the controller 61B advances to S66.

In S66 the controller 61B reads the device ID from the second area 622 of the main memory 62. The controller 61B also reads the device group ID from the seventh area 627 of the main memory 62. The controller 61B then transmits a device group registration request including the device ID and the device group ID read above to the server 8 via the communication unit 63 and subsequently advances to S67.

In S67 the controller 61B determines whether a registration successful notification is received from the server 8 via the communication unit 63 to indicate that the device ID and the device group ID of the new printer 1B are newly registered in the device group registration table 821. When the controller 61B determines that a registration successful notification is not received (S67: NO), the controller 61B repeatedly executes the determination in S67 to determine whether a registration successful notification is received. On the other hand, when the controller 61B determines that a registration successful notification is received from the server 8 via the communication unit 63 (S67: YES), the controller 61B advances to S68.

In S68 the controller 61B reads the service start flag indicating whether subscription printing using special toner cartridges 4 is permitted from the main memory 62, sets the read service start flag to ON, and re-stores the service start flag in the main memory 62. Thereafter, the controller 61B returns to S61 and repeats the above process. As a result of this process, the new printer 1B is permitted to perform subscription printing using special toner cartridges 4.

On the other hand, when the controller 61B determines in S62 that a settings file including data for settings information indicating settings related to operations of the new printer 1B is received from the server 8 via the communication unit 63 (S62: YES), the controller 61B advances to S69. In S69 the controller 61B stores the data included in the received settings file in the eighth area 628 of the main memory 62 as settings information indicating settings related to operations of the new printer 1B.

Through this process, settings information stored in the main memory 62 of the new printer 1B can be automatically set to the settings information stored in the main memory 62 of the old printer 1A. Therefore, the user can easily transition from the old printer 1A to the new printer 1B. Hence, settings information stored in the main memory 62 of another image-forming device 1 belonging to the same image-forming device group to which the new printer 1B belongs can be applied to the new printer 1B.

Second Embodiment

Below, a second embodiment of the present disclosure will be described with reference to FIGS. 10 through 14, wherein like parts and components having the same functions as the parts and components described in the first embodiment are designated with the same reference numerals to avoid duplicating description.

Figure 11:
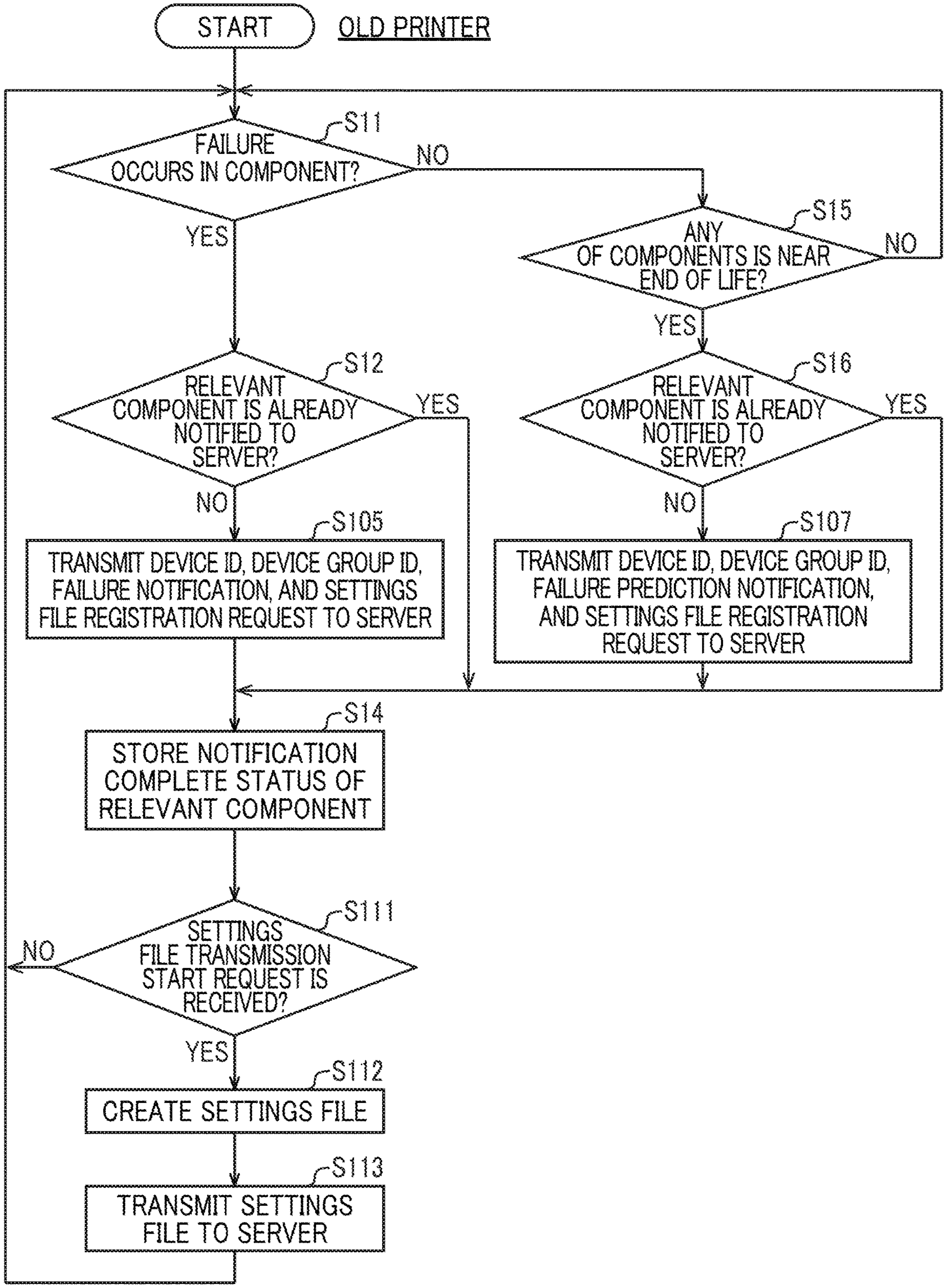
FIG. 11 is a flowchart illustrating an example of steps in a second failure notification process executed by the controller of the old printer.

In the old printer 1A according to the second embodiment, the controller 61A executes a second failure notification process illustrated in FIG. 11 in place of the process of S11 through S17 illustrated in FIG. 6. Furthermore, in the server 8 according to the second embodiment, the server control unit 81 executes a second replacement process illustrated in FIGS. 12 through 14 in place of the replacement process of S21 through S25, S31 through S39, and S51 through S54 illustrated in FIGS. 7 and 8. Furthermore, in place of the settings file registration table 822 illustrated in FIG. 5, the server memory 82 of the server 8 according to the second embodiment stores a printer replacement table 823 illustrated in FIG. 10. The controller 61B in the new printer 1B according to the second embodiment executes the setting process in S61 through S69 illustrated in FIG. 9 as described for the new printer 1B according to the first embodiment.

<Printer Replacement Table 823>

First, the printer replacement table 823 stored in the server memory 82 in the server 8 according to the second embodiment will be described with reference to FIG. 10. FIG. 10 illustrates an example of the printer replacement table 823 stored in the server memory 82 according to the second embodiment. As illustrated in FIG. 10, the printer replacement table 823 is configured of old printer device IDs, new printer device IDs, device group IDs, and old printer settings files. The "OLD PRINTER DEVICE ID" column stores therein the device IDs of image-forming devices 1 that have failed or the like (the old printers 1A).

The "NEW PRINTER DEVICE ID" column stores therein the device IDs of image-forming devices 1 (new printers 1B) replacing respective old printers 1A in association with the device IDs of the respective old printers 1A. The "DEVICE GROUP ID" column stores therein device group IDs identifying the image-forming device groups to which the old printers 1A and new printers 1B belong. The "OLD PRINTER SETTINGS FILE" column stores therein settings files that include data for the settings information stored in the eighth area 628 of the main memory 62 in the corresponding old printers 1A.

<Second Failure Notification Process Executed by Old Printer 1A>

Next, steps in a second failure notification process executed by the controller 61A of the old printer 1A according to the second embodiment will be described with reference to FIG. 11. FIG. 11 is a flowchart illustrating an example of steps in the second failure notification process executed by the controller 61A of the old printer 1A according to the second embodiment. A program for implementing the process illustrated in FIG. 11 is stored in the main memory 62. The controller 61A of the old printer 1A executes the process illustrated in FIG. 11 at prescribed intervals, such as intervals of several milliseconds to several tens of milliseconds.

As illustrated in FIG. 11, the controller 61A executes the process of S11 and S12 described above (see FIG. 6). When the controller 61A determines that the component name of the failed component and a description of the failure are already notified to the server 8 (S12: YES), the controller 61A advances to S14 described later. However, when the controller 61A determines that the server 8 is not yet notified of the component name of the failed component and a description of the failure (S12: NO), the controller 61A advances to S105.

In S105 the controller 61A reads the device ID from the second area 622 of the main memory 62. The controller 61A also reads the device group ID from the seventh area 627 of the main memory 62. Next, the controller 61A transmits the device ID and the device group ID that are read from the main memory 62, a failure notification that includes information identifying the railed component, and a settings file registration request that requests the server 8 to register the settings file to the server 8 via the communication unit 63.

After completing the process in S14 described above, the controller 61A advances to S111. In S111 the controller 61A determines whether a settings file transmission start instruction is received via the communication unit 63 instructing the controller 61A to begin transmitting the settings file to the server 8. When the controller 61A determines that a settings file transmission start instruction is not received via the communication unit 63 (S111: NO), the controller 61A returns to S11 and repeats the above process.

However, when the controller 61A determines that a settings file transmission start instruction is received via the communication unit 63 (S111: YES), the controller 61A advances to S112. In S112 the controller 61A reads the settings information stored in the eighth area 628 of the main memory 62, creates a settings file that includes data for this settings information, and stores the settings file in the main memory 62. Subsequently, the controller 61A advances to S113. In S113 the controller 61A reads the settings file from the main memory 62 and transmits the settings file to the server 8 via the communication unit 63. Thereafter, the controller 61A returns to S11 and repeats the above process.

On the other hand, when the controller 61A determines in S11 described above that no components have failed in the old printer 1A (S11: NO), the controller 61A executes the process of S15 and S16 described in the first embodiment. When the controller 61A determines in S16 that a failure prediction notification including information identifying a component that is near the end of life is not transmitted to the server 8 (S16: NO), in S107 the controller 61A reads the device ID from the second area 622 of the main memory 62. The controller 61A also reads the device group ID from the seventh area 627 of the main memory 62.

Also in S107, the controller 61A transmits the device ID and the device group ID that are read from the main memory 62, a failure prediction notification including information identifying the component that is near the end of life, and a settings file registration request that requests the server 8 to register the settings file to the server 8 via the communication unit 63. Thereafter, the controller 61A executes the process beginning from S14 described above.

Accordingly, when an old printer 1A needs to be replaced with a new printer 1B due to a failure or the like, the controller 61A of the old printer 1A can notify the server 8 of this status. The controller 61A can also notify the server 8 of the device ID of the old printer 1A and the device group ID identifying the image-forming device group to which the old printer 1A belongs.

<Second Replacement Process Executed by Server 8>

Figure 12:
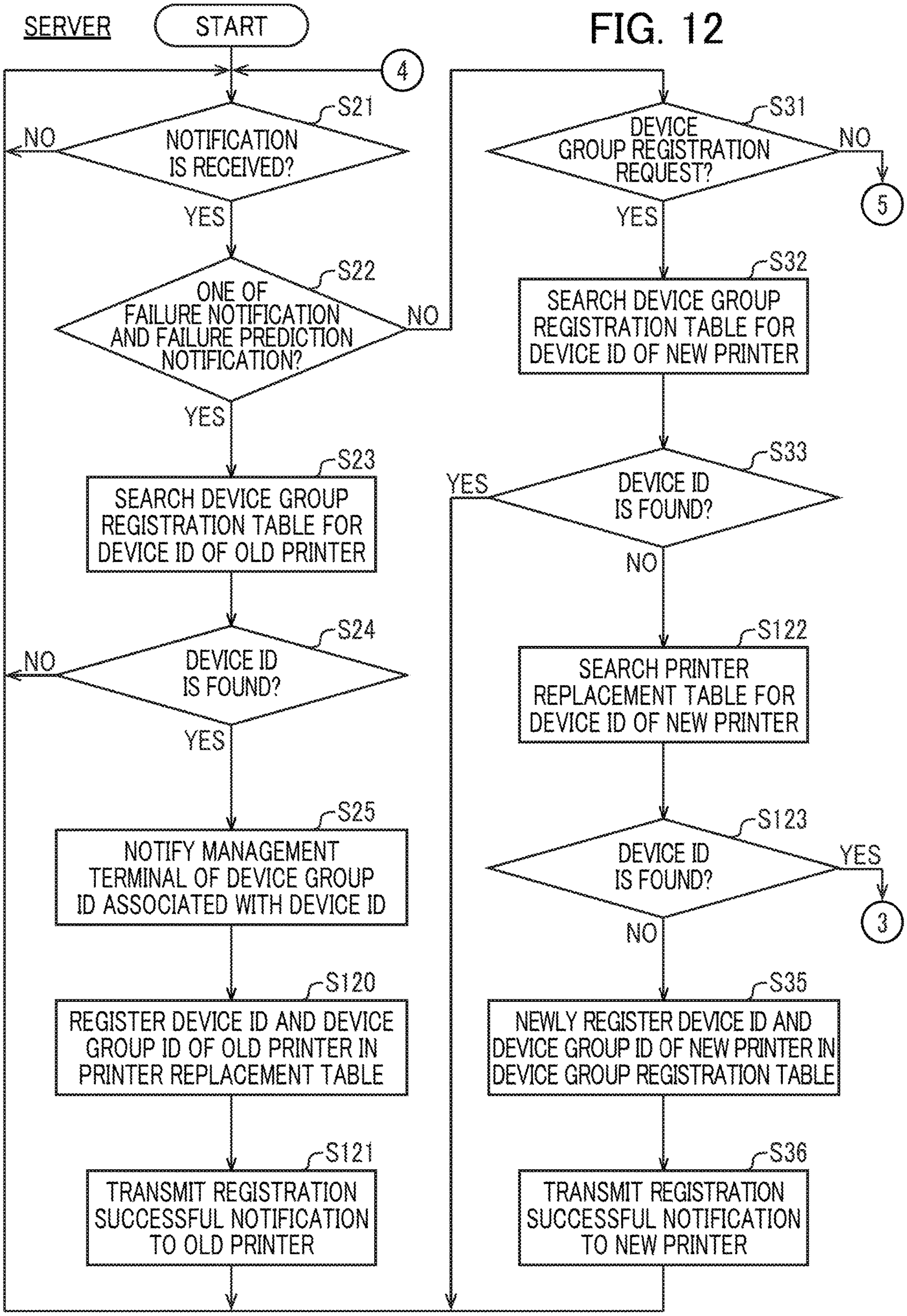
FIG. 12 is a flowchart illustrating a first part of an example of steps in a second replacement process executed by the server control unit of the server when an old printer is replaced with a new printer.
Figure 13:
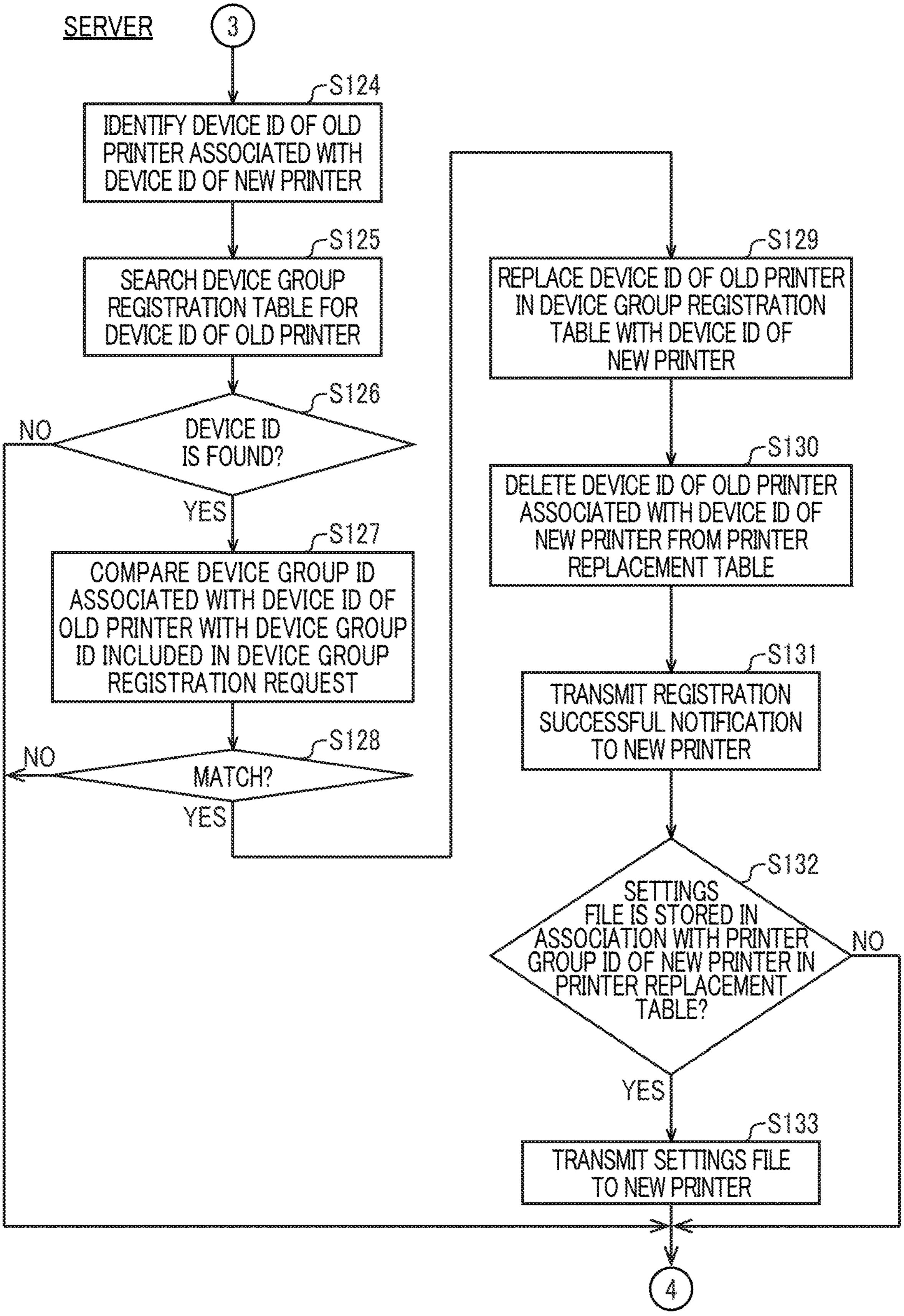
FIG. 13 is a flowchart illustrating a second part of the example of the steps in the second replacement process executed by the server control unit of the server when an old printer is replaced with a new printer.
Figure 14:
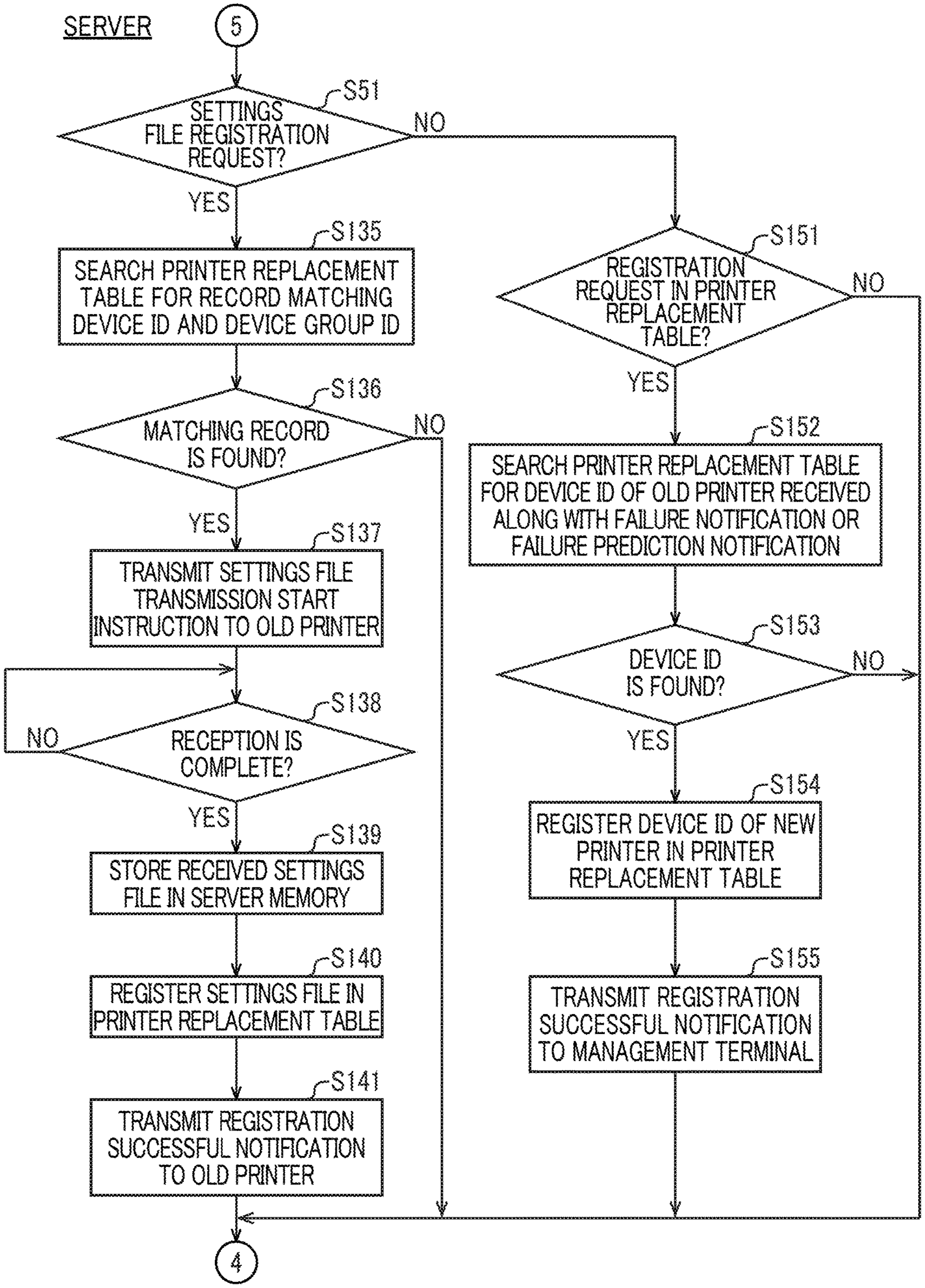
FIG. 14 is a flowchart illustrating a third part of the example of the steps in the second replacement process executed by the server control unit of the server when an old printer is replaced with a new printer.

Next, steps in a second replacement process executed by the server control unit 81 of the server 8 will be described with reference to FIGS. 12 through 14. FIGS. 12 through 14 are flowcharts illustrating an example of steps in a second replacement process executed by the server control unit 81 of the server 8 according to the second embodiment when an old printer 1A is replaced with a new printer 1B. A program for implementing the process illustrated in the flowcharts of FIGS. 12 through 14 is stored in the server memory 82. The server control unit 81 executes the process illustrated in FIGS. 12 through 14 at prescribed intervals, such as intervals of several milliseconds to several tens of milliseconds.

As illustrated in FIG. 12, after executing the process in S21 through S25 described in the first embodiment (see FIG. 7), the server control unit 81 advances to S120. In S120 the server control unit 81 registers (stores) the device ID of the old printer 1A that is received in S22 together with the failure notification or the failure prediction notification in the "OLD PRINTER DEVICE ID" column of the printer replacement table 823 (see FIG. 10) stored in the server memory 82. The server control unit 81 also registers (stores) the device group ID of the old printer 1A received in S22 together with the failure notification or the failure prediction notification in the "DEVICE GROUP ID" column of the printer replacement table 823 (see FIG. 10) in association with the device ID of the old printer 1A. Subsequently, the server control unit 81 advances to S121.

In S121 the server control unit 81 transmits a registration successful notification to the old printer 1A via the server communication unit 83 indicating that the device ID and the device group ID of the old printer 1A are registered in the printer replacement table 823. Thereafter, the server control unit 81 returns to S21 and repeats the above process.

On the other hand, when the server control unit 81 determines in S22 that the received notification is neither a failure notification nor a failure prediction notification (S22: NO), the server control unit 81 executes the process in S31 through S33 described in the first embodiment (see FIG. 7). When the server control unit 81 determines in S33 that the device ID of the new printer 1B included in the received device group registration request is found (S33: YES), the server control unit 81 returns to S21 and repeats the above process.

However, when the server control unit 81 determines that the device ID of the new printer 1B included in the received device group registration request is not found (S33: NO), the server control unit 81 advances to S122. In S122 the server control unit 81 searches the device IDs stored in the "NEW PRINTER DEVICE ID" column of the printer replacement table 823 in the server memory 82 for the device ID of the new printer 1B included in the received device group registration request. Subsequently, the server control unit 81 advances to S123.

In S123 the server control unit 81 determines whether the device ID of the new printer 1B is found in the "NEW PRINTER DEVICE ID" column of the printer replacement table 823. When the server control unit 81 determines that the device ID of the new printer 1B is not found in the "NEW PRINTER DEVICE ID" column of the printer replacement table 823 (S123: NO), the server control unit 81 executes the process of S35 through S36 described in the first embodiment (see FIG. 7), and subsequently returns to S21 and repeats the above process.

However, when the server control unit 81 determines that the device ID of the new printer 1B is found in the "NEW PRINTER DEVICE ID" column of the printer replacement table 823 (S123: YES), the server control unit 81 advances to S124 of FIG. 13.

As illustrated in FIG. 13, in S124 the server control unit 81 identifies the device ID of the old printer 1A in the "OLD PRINTER DEVICE ID" column of the printer replacement table 823 that is associated with the device ID of the new printer 1B found in the "NEW PRINTER DEVICE ID" column of the printer replacement table 823. Subsequently, the server control unit 81 advances to S125.

In S125 the server control unit 81 searches the device IDs stored in the "DEVICE ID" column of the device group registration table 821 stored in the server memory 82 for the device ID of the old printer 1A identified in S124, and subsequently the server control unit 81 advances to S126. In S126 the server control unit 81 determines whether the device ID of the old printer 1A identified in S124 is found in the "DEVICE ID" column of the device group registration table 821.

When the server control unit 81 determines that the device ID of the old printer 1A identified in S124 is not found in the "DEVICE ID" column of the device group registration table 821 (S126: NO), the server control unit 81 returns to S21 of FIG. 12 and repeats the above process.

However, when the server control unit 81 determines that the device ID of the old printer 1A identified in S124 is found in the "DEVICE ID" column of the device group registration table 821 (S126: YES), the server control unit 81 advances to S127.

In S127 the server control unit 81 reads the device group ID associated with the device ID of the old printer 1A identified in S124 from the "DEVICE GROUP ID" column of the device group registration table 821. The server control unit 81 then compares the device group ID read from the device group registration table 821 with the device group ID identifying the image-forming device group to which the new printer 1B, which is included in the notification of the device group registration request received from the new printer 1B, belongs.

In S128 the server control unit 81 determines whether the device group ID read from the device group registration table 821 matches the device group ID included in the notification of the device group registration request. When the server control unit 81 determines that the device group ID read from the device group registration table 821 does not match the device group ID included in the notification of the device group registration request (S128: NO), the server control unit 81 returns to S21 of FIG. 12 and repeats the above process.

However, when the server control unit 81 determines that the device group ID read from the device group registration table 821 matches the device group ID included in the notification of the device group registration request (S128: YES), the server control unit 81 advances to S129. In S129 the server control unit 81 replaces the device ID of the old printer 1A stored in the "DEVICE ID" column of the device group registration table 821 with the device ID of the new printer 1B included in the notification of the device group registration request. Subsequently, the server control unit 81 advances to S130.

In S130 the server control unit 81 deletes the device ID of the old printer 1A associated with the device ID of the new printer 1B from the "OLD PRINTER DEVICE ID" column of the printer replacement table 823 stored in the server memory 82, and advances to S131. In S131 the server control unit 81 transmits a registration successful notification to the new printer 1B via the server communication unit 83 indicating that the device ID and the device group ID of the new printer 1B are registered in the device group registration table 821. Subsequently, the server control unit 81 advances to S132.

In S132 the server control unit 81 reads the device group ID of the new printer 1B that is included in the notification of the device group registration request. Next, in S132 the server control unit 81 determines whether a settings file is stored in association with the device group ID of the new printer 1B in the "OLD PRINTER SETTINGS FILE" column of the printer replacement table 823 stored in the server memory 82. When the server control unit 81 determines that a settings file is not stored in association with the device group ID of the new printer 1B in the "OLD PRINTER SETTINGS FILE" column of the printer replacement table 823 (S132: NO), the server control unit 81 returns to S21 of FIG. 12 and repeats the above process.

However, when the server control unit 81 determines that a settings file is stored in association with the device group ID of the new printer 1B in the "OLD PRINTER SETTINGS FILE" column of the printer replacement table 823 (S132: YES), the server control unit 81 advances to S133. In S133 the server control unit 81 reads data for the settings information included in the settings file associated with the device group ID of the new printer 1B from the "OLD PRINTER SETTINGS FILE" column of the printer replacement table 823. The server control unit 81 then transmits the settings file including this data for the settings information to the new printer 1B via the server communication unit 83, and subsequently returns to S21 and repeats the above process.

On the other hand, when the server control unit 81 determines in S31 illustrated in FIG. 12 that the received notification is not a notification of a device group registration request received from the new printer 1B (S31: NO), the server control unit 81 advances to S51 illustrated in FIG. 14.

As illustrated in FIG. 14, in S51 the server control unit 81 determines whether the received notification is a notification of a settings file registration request that includes a device ID, a device group ID, and a settings file. When the server control unit 81 determines that the received notification is a notification of a settings file registration request received from the old printer 1A (S51: YES), the server control unit 81 advances to S135. In S135 the server control unit 81 searches the printer replacement table 823 stored in the server memory 82 for a record (compound data) including a device ID and a device group ID matching the device ID and the device group ID of the old printer 1A. Subsequently, the server control unit 81 advances to S136.

In S136 the server control unit 81 determines whether a record including a device ID and a device group ID matching the device ID and the device group ID of the old printer 1A is found in the printer replacement table 823. When the server control unit 81 determines that a record including a device ID and a device group ID matching the device ID and the device group ID of the old printer 1A is not found in the printer replacement table 823 (S136: NO), the server control unit 81 returns to S21 of FIG. 12 and repeats the above process.

However, when the server control unit 81 determines that a record including a device ID and a device group ID matching the device ID and the device group ID of the old printer 1A is found in the printer replacement table 823 (S136: YES), the server control unit 81 advances to S137. In S137 the server control unit 81 transmits a settings file transmission start instruction to the old printer 1A via the server communication unit 83, and subsequently advances to S138. This settings file transmission start instruction is a notification instructing the old printer 1A to begin transmitting a settings file including data for the settings information stored in the eighth area 628 of the main memory 62.

In S138 the server control unit 81 determines whether reception of the settings file including data for settings information is complete from the old printer 1A via the server communication unit 83. When the server control unit 81 determines that reception of the settings file including data for settings information is not complete from the old printer 1A via the server communication unit 83 (S138: NO), the server control unit 81 continually repeats the determination in S138 until reception is complete.

When the server control unit 81 determines that reception of the settings file including data for settings information is complete from the old printer 1A via the server communication unit 83 (S138: YES), the server control unit 81 advances to S139. In S139 the server control unit 81 stores the received settings file including the data for the settings information in the server memory 82 and advances to S140.

In S140 the server control unit 81 registers (stores) the received settings file including the data for the settings information in the "OLD PRINTER SETTINGS FILE" column of the printer replacement table 823 corresponding to the record that matches the device ID and the device group ID of the old printer 1A. Subsequently, the server control unit 81 advances to S141. In S141 the server control unit 81 transmits a registration successful notification to the old printer 1A via the server communication unit 83 indicating that the settings file including the data for the settings information is successfully registered (stored). Thereafter, the server control unit 81 returns to S21 of FIG. 12 and repeats the above process.

On the other hand, when the server control unit 81 determines in S51 that the received notification is not a notification of a settings file registration request received from the old printer 1A (S51: NO), the server control unit 81 advances to S151. In S151 the server control unit 81 determines whether the notification received via the server communication unit 83 is a notification of a registration request received from the management terminal 7 that includes a device ID of the new printer 1B. This notification of the registration request is a notification requesting the server control unit 81 to register (store) the device ID of the new printer 1B in the printer replacement table 823.

When the server control unit 81 determines that the notification received via the server communication unit 83 is not a notification of a registration request from the management terminal 7 including the device ID of the new printer 1B (S151: NO), the server control unit 81 returns to S21 of FIG. 12 and repeats the above process.

However, when the server control unit 81 determines that the notification received via the server communication unit 83 is a notification of a registration request from the management terminal 7 including the device ID of the new printer 1B (S151: YES), the server control unit 81 advances to S152. In S152 the server control unit 81 searches the "OLD PRINTER SETTINGS FILE" column of the printer replacement table 823 stored in the server memory 82 for the device ID of the old printer 1A from which a failure notification or a failure prediction notification is received. Subsequently, the server control unit 81 advances to S153.

In S153 the server control unit 81 determines whether a device ID matching the device ID of the old printer 1A is found in the "OLD PRINTER DEVICE ID" column of the printer replacement table 823. When the server control unit 81 determines that a device ID matching the device ID of the old printer 1A is not found in the "OLD PRINTER DEVICE ID" column of the printer replacement table 823 (S153: NO), the server control unit 81 returns to S21 illustrated in FIG. 12 and repeats the above process.

However, when the server control unit 81 determines that a device ID matching the device ID of the old printer 1A is found in the "OLD PRINTER DEVICE ID" column of the printer replacement table 823 (S153: YES), the server control unit 81 advances to S154. In S154 the server control unit 81 registers (stores) the device ID of the new printer 1B, which is included in the notification of the registration request, in the "NEW PRINTER DEVICE ID" column of the printer replacement table 823 in association with the device ID matching the device ID of the old printer 1A. Subsequently, the server control unit 81 advances to S155.

In S155 the server control unit 81 transmits a registration successful notification to the management terminal 7 via the server communication unit 83 indicating that the device ID of the new printer 1B is registered. Thereafter, the server control unit 81 returns to S21 illustrated in FIG. 12 and repeats the above process.

<Modifications of the Embodiments>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

<First Modification>

The four toner cartridges 4 may be attached to in a common drum cartridge 20. In this case, the cartridge holder 13 should be shaped to hold a single drum cartridge 20.

<Second Modification>

The drum cartridge 20 may include the developing roller 41 in addition to the photosensitive drum 21, the cartridge casing, the drum memory 22, and the charger. In this case, the photosensitive drum 21, the drum memory 22, the charger, and the developing roller 41 are provided in the cartridge casing. Additionally, the toner cartridge 4 includes the cartridge casing and the toner memory 42 but does not include the developing roller 41. The cartridge casing accommodates toner therein. The outer circumferential surface of the developing roller 41 contacts the outer circumferential surface of the photosensitive drum 21 inside the drum cartridge 20.

<Third Modification>

The toner cartridge 4 may be configured of two cartridges (not illustrated). In this case, one of the two cartridges constituting the toner cartridge 4 includes the developing roller 41, while the other of the two cartridges constituting the toner cartridge 4 includes the cartridge casing and the toner memory 42. The cartridge casing accommodates toner therein.

<Fourth Modification>

The image-forming device 1 may include a single cartridge (not illustrated) in place of the drum cartridge 20 and the toner cartridge 4. This single cartridge includes the photosensitive drum 21, a cartridge casing, a memory, the charger, and the developing roller 41. The outer circumferential surface of the developing roller 41 contacts the outer circumferential surface of the photosensitive drum 21 inside the single cartridge. The cartridge casing of the single cartridge accommodates toner therein.

<Fifth Modification>

In the image-forming device 1, the drum cartridges 20 and the corresponding toner cartridges 4 may be attachable to and detachable from the main casing 10 independently of each other.

<Sixth Modification>

The image-forming device 1 may also be a multifunction printer (MFP) having other functions such as a scanning function or a facsimile function. An image-forming device 1 configured as an MFP may still execute processes the same as various processes described in the above embodiments. The image-forming device 1 according to this modification exhibits the same advantages as the image-forming device 1 in the embodiments described above.

Furthermore, when the image-forming device 1 is an MFP, the settings information stored in the eighth area 628 of the main memory 62 includes information specifying settings related to operations of the MFP. For example, the settings information may include information specifying the installation location of the MFP, information specifying contact information, information specifying the IP address of the MFP, the IP address of the mail server, scan settings, and copy settings. Specifically, scan settings may include the IP address for the destination of the scanned image data, the scanning resolution, a setting for single-sided or double-sided scanning, and a setting for monochrome or color scanning, for example.

<Seventh Modification>

The printing medium used in the image-forming device 1 is not limited to printing paper but may be tape, for example. When the printing medium is tape, a tape cassette for supplying tape is attached to the image-forming device 1, and the image-forming device 1 performs printing on the tape conveyed from the tape cassette. In this case, the image-forming device 1 may be a laser printer or an inkjet printer.

<Eighth Modification>

The image-forming device 1 may be an inkjet printer. When the image-forming device 1 is an inkjet printer, ink cartridges are attachable to the cartridge holders 13 of the image-forming device 1 instead of the drum cartridges 20 and the toner cartridges 4 described in the above embodiments.

There is no particular restriction on the number of ink cartridges attachable to the image-forming device 1. For example, a total of four ink cartridges corresponding to the four colors of cyan, magenta, yellow, and black may be attached to the image-forming device 1, or a single ink cartridge for the color of black may be attached to the image-forming device 1. Each of the ink cartridges includes a cartridge casing that is filled with ink, as the consumable, and an ink memory storing ink cartridge information therein. The ink cartridge information may include an ink ID, ink type information, remaining ink information, a new product flag, and a device group ID, for example.

The ink ID is identification information for the ink cartridge and is information included in the ink cartridge information in place of the toner ID described in the above embodiments. The ink type information is information indicating the type of ink cartridge and is information included in the ink cartridge information in place of the toner type information described in the above embodiments. The remaining ink information is information indicating the remaining quantity of ink in the ink cartridge and is information included in the ink cartridge information in place of the remaining toner information described in the above embodiments. The new product flag is information corresponding to information of the same name among the information related to the toner cartridge 4 in the above embodiments. In other words, the term "toner" for information related to the toner cartridge 4 in the embodiments is replaced with "ink"; e.g., "toner cartridge" becomes "ink cartridge."

An agitator for agitating the ink may also be provided in the cartridge casing of the ink cartridge. The agitator operates in response to instructions from the controller 61 when the ink cartridge is attached to the image-forming device 1.

Steps performed in the various processes described in the above embodiments are similar when the image-forming device 1 is an inkjet printer. Specifically, when the image-forming device 1 is an inkjet printer, the terms "toner cartridge 4" and "toner memory 42" in the above embodiments may be replaced with "ink cartridge" and "ink memory."

Similarly, the terms "drum cartridge 20" and "drum memory 22" in the above embodiments may be replaced with "consumable" and "consumable memory." Additionally, each type of information included in the information related to the toner cartridge 4 in the above embodiments may be replaced with corresponding information in the ink cartridge information. Thus, the image-forming device 1 of this modification can exhibit the same advantages described for the image-forming device 1 in the above embodiments.

<Implementation Through Software>

The functions of the image-forming device 1 can be implemented by a program that causes a computer to function as the image-forming device 1 and that causes the computer to function as the controller 61 of the image-forming device 1.

In this case, the image-forming device 1 includes a computer possessing at least one control device (e.g., a processor) and at least one storage device (e.g., a memory) as the hardware required for executing the program. Each function described in the above embodiments is implemented by executing the program using these control devices and storage devices.

The program described above may be stored in one or more non-transitory computer-readable storage media. These storage media may be provided in the image-forming device 1 but need not be. In the latter case, the program described above may be transmitted to the image-forming device 1 through any wired or wireless transmission medium.

All or some of the functions of the controller 61 may also be implemented by logic circuits. For example, an integrated circuit having logic circuits that function as the above control blocks falls within the scope of the present disclosure.

<Technical Advantages of Embodiments>

With the image-forming device 1 (1B) according to the embodiments described above, the controller 61 (61B) performs a first determination process (S64 of FIG. 9) to determine whether device group ID (common identification information) is stored in the main memory 62 of the image-forming device (hereinafter called the "new printer 1B"). When the controller 61B determines in the first determination process that device group ID is stored in the main memory 62, the controller 61B subsequently acquires settings information stored in the main memory 62 of another image-forming device 1 (1A) included in the image-forming device group associated with the device group ID (hereinafter called the "old printer 1A") from an external device (hereinafter called the "server 8") via the communication unit 63. As a result, the controller can automatically store settings information of the old printer 1A in the main memory 62 of the new printer 1B. Thus, the user can transition from the old printer 1A currently in use to the new printer 1B more easily than before.

With the image-forming device 1 (1B) according to the embodiments described above, the settings information stored in the main memory 62 of the old printer 1A included in the image-forming device group associated with the device group ID is registered in the server 8 in association with the device group ID. Accordingly, by connecting to the server 8 via the communication unit 63, the new printer 1B can acquire settings information of the old printer 1A from the server 8. Thus, the controller 61B can store the settings information of the old printer 1A included in the image-forming device group corresponding to the device group ID in the main memory 62 of the new printer 1B.

With the image-forming device 1 (1B) according to the embodiments described above, when it is necessary to replace the old printer 1A with a new printer 1B, the controller 61B can transmit the device ID (device identification information), the settings information, and the device group ID of the old printer 1A to the server 8. Accordingly, by connecting to the server 8 via the communication unit 63, the new printer 1B can acquire from the server 8 the settings information of the old printer 1A corresponding to the device ID. Thus, the settings information of the old printer 1A that needs to be replaced from among the image-forming devices included in the image-forming device group associated with the device group ID can be stored in the new printer 1B.

With the image-forming device 1 (1B) according to the embodiments described above, the controller 61B transmits the device group ID and the device ID to the server 8, whereby the server 8 can store the device ID of the new printer 1B with which the old printer 1A is replaced in association with the device group ID and the settings information managed by the server 8.

With the image-forming device 1 according to the embodiments described above, special cartridges (special consumables) can be used in the image-forming device 1 after device group ID and the device ID are registered in the server 8. This enables the image-forming device 1 to perform subscription printing using special cartridges after the settings information corresponding to the device group ID is stored in the main memory 62, thereby enabling the image-forming device to perform subscription printing in accordance with the settings information set for the image-forming device group.

With the image-forming device 1 (1B) according to the embodiments described above, the settings information can be stored in the main memory 62 of the new printer 1B to set the print specifications of the new printer 1A to those of the old printer 1A replaced with the new printer 1B.

With the image formation system 100 according to the embodiments described above, the user can automatically have the settings information of the old printer 1A included in the image-forming device group automatically stored in the main memory 62 of the new printer 1B by connecting the new printer 1B to the communication network NT.

With the image formation system 100 according to the embodiments described above, the new printer 1B to be replaced with the old printer 1A can reliably acquire the settings information of the old printer 1*a* from the server 8 (external device) via the communication network NT. Therefore, the settings information of the old printer 1A can be stored in the main memory 62 of the new printer 1B included in the image-forming device group associated with the device group ID.

What is claimed is:

1. An image-forming device comprising:

a main casing to which a consumable having a consumable memory is attachable;

a main memory;

a communication interface; and a controller, wherein the main memory is capable of storing:

common identification information representing an image-forming device group including the image-forming device and another image-forming device that differs from the image-forming device; and settings information including a setting related to an operation of the image-forming device, and wherein the controller is configured to perform:

a first determination process to determine whether the common identification information is stored in the main memory of the image-forming device;

in response to determining in the first determination process that the common identification information is stored in the main memory of the image-forming device, an acquisition process to acquire, from an external device via the communication interface, settings information stored in a main memory of the another image-forming device included in the image-forming device group corresponding to the common identification information; and a first storage process to store the settings information acquired in the acquisition process in the main memory of the image-forming device.

2. The image-forming device according to claim 1, wherein the settings information is registered in the external device in association with the common identification information.

3. The image-forming device according to claim 2, wherein the main memory is capable of further storing: device identification information identifying the image-forming device, and wherein in the acquisition process, the controller transmits the common identification information and the device identification information stored in the main memory of the image-forming device to the external device via the communication interface, and thereafter acquires the settings information stored in the main memory of the another image-forming device included in the image-forming device group corresponding to the transmitted common identification information from the external device via the communication interface.

4. The image-forming device according to claim 3, wherein the consumable memory of the consumable stores therein type information specifying a type of the consumable, the type of the consumable being one of a special consumable which can be used in a state where an agreement concluded for the image-forming device is in effect and a normal consumable which can be used regardless of whether an agreement is concluded, and wherein the controller is configured to further perform:

after the acquisition process is performed, a third determination process to determine whether a notification indicating that the common identification information and the device identification information are registered in the external device is received from the external device via the communication interface; and in response to determining that the notification is received, a permitting process to permit the image-forming device to perform operations using the special consumable.

5. The image-forming device according to claim 1, wherein the main memory is capable of further storing:

status information indicating whether a failure occurs in the image-forming device; and device identification information identifying the image-forming device, and wherein the controller is configured to further perform:

a second determination process to determine whether the image-forming device needs to be replaced with another image-forming device on the basis of the status information stored in the main memory of the image-forming device; and in response to determining in the second determination process that the image-forming device needs to be replaced, a transmission process to transmit, to the external device via the communication interface, the device identification information, the settings information, and the common identification information stored in the main memory of the image-forming device.

6. The image-forming device according to claim 1, wherein the settings information includes at least one setting selected from a plurality of settings including settings for: single-sided printing; double-sided printing for long-edge binding; double-sided printing for short-edge binding; print all pages; print current page; print specified range of pages; print one copy; portrait printing; landscape printing; A4 paper; A3 paper; standard margin settings; narrow margin settings; wide margin settings; print one page per sheet; and print two pages per sheet.

7. A system comprising:

an image-forming device group including a first image-forming device and a second image-forming device that differs from the first image-forming device;

a server configured to communicate with each of the first image-forming device and the second image-forming device via a communication network; and a management terminal configured to communicate with the server via the communication network, wherein the first image-forming device comprises:

a first main memory storing first device identification information identifying the first image-forming device; and a first controller, wherein the second image-forming device comprises:

a second main memory storing second device identification information identifying the second image-forming device; and a second controller, wherein the server comprises:

a server memory configured to store the first device identification information, the second device identification information, and settings information in association with common identification information identifying the image-forming device group, the settings information including a setting related to an operation of each of the first image-forming device and the second image-forming device included in the image-forming device group; and a server controller, wherein the second main memory is capable of storing:

the common identification information representing the image-forming device group in which the second image-forming device is included; and settings information including a setting related to an operation of the second image-forming device, wherein the server controller is configured to perform:

a first determination process to determine whether the second device identification information and a replacement request are received via the communication network, the replacement request requesting to replace the second image-forming device with the first image-forming device;

in response to determining in the first determination process that the second device identification information and the replacement request are received, a first storage process to read the common identification information stored in the server memory in association with the received second device identification information and to store the read common identification information in the first main memory via the management terminal;

a second determination process to determine whether the common identification information which is stored in the first main memory in the first storage process is received from the first image-forming device via the communication network; and in response to determining in the second determination process that the common identification information is received, a transmission process to read the settings information stored in the server memory in association with the received common identification information and to transmit the read settings information to the first image-forming device via the communication network, and wherein the first controller is configured to perform:

a second storage process to store the settings information received from the server in the first main memory.

8. The system according to claim 7, wherein the settings information is stored in the server memory in association with the common identification information separately from the first device identification information and the second device identification information.

9. The system according to claim 7, wherein in the first determination process, the server controller determines whether the second device identification information, the replacement request, and the settings information stored in the second main memory are received via the communication network, wherein when the server controller determines in the first determination process that the second device identification information, the replacement request, and the settings information are received, the server controller stores the received settings information in the server memory with performing the first storage process, and wherein when the server controller determines in the second determination process that the common identification information is received from the first image-forming device, in the transmission process, the server controller reads the settings information stored in the server memory in association with the received common identification information and to transmit the read settings information to the first image-forming device via the communication network.

* * * * *